US012271717B2

(12) United States Patent
Mahjour et al.

(10) Patent No.: US 12,271,717 B2
(45) Date of Patent: Apr. 8, 2025

(54) LOOP INDEX SET MERGING OPTIMIZATION FOR PROGRAM INSTRUCTIONS

(71) Applicant: International Business Machines Corporation, Armonk, NY (US)

(72) Inventors: Bardia Mahjour, Newmarket (CA); Prasanth Chatarasi, White Plains, NY (US); Jintao Zhang, White Plains, NY (US); Alberto Mannari, Basel (CH)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 18/302,214

(22) Filed: Apr. 18, 2023

(65) Prior Publication Data

US 2024/0354081 A1 Oct. 24, 2024

(51) Int. Cl.
*G06F 9/455* (2018.01)
*G06F 8/41* (2018.01)
(Continued)

(52) U.S. Cl.
CPC .................................. *G06F 8/443* (2013.01)

(58) Field of Classification Search
CPC . G06F 8/442; G06F 8/45; G06F 8/456; G06F 8/443; G06F 8/44; G06F 8/452; G06F 9/30174; G06F 9/30065; G06F 8/72; G06F 8/34; G06F 9/541; G06F 8/4441; G06F 9/383; G06F 8/4442; G06F 9/30047; G06F 8/457; G06F 8/52; G06F 16/9024; G06F 9/4486
See application file for complete search history.

(56) References Cited

U.S. PATENT DOCUMENTS 6,745,384 B1 * 6/2004 Biggerstaff ........... G06F 8/4441
717/136
6,772,415 B1 * 8/2004 Danckaert ............... G06F 8/452
712/241
(Continued)

FOREIGN PATENT DOCUMENTS

DE 102014212437 A1 1/2016

OTHER PUBLICATIONS

Asher et al., "Source Level Merging of Independent Programs," 16th International Conference on Parallel Architecture and Compilation Techniques (PACT 2007), Sep. 15-19, 2007, Brasov, Romania, 1 page.

(Continued)

*Primary Examiner* — Thuy Dao
(74) *Attorney, Agent, or Firm* — Yee & Associates, P.C.

(57) ABSTRACT

A computer implemented method for merging loops. A number of processor units identifies loops in computer code. The loops are sequences of instructions that are repeated until conditions for the loops are reached. The number of processor units creates a tree comprising nodes that represent the loops and edges that represent relationships between nodes. The number of processor units utilizes the tree to identify a pair of candidate loops from sibling nodes. The number of processor units creates a new loop from the pair of candidate loops with an expanded iteration space based on iteration spaces for the pair of candidate loops in response to the pair of candidate loops being eligible for merging.

25 Claims, 21 Drawing Sheets

(51) Int. Cl.
*G06F 9/30* (2018.01)
*G06F 9/38* (2018.01)
*G06F 9/445* (2018.01)

(56) References Cited

U.S. PATENT DOCUMENTS

| | | | |
|---|---|---|---|
| 9,015,690 | B2 | 4/2015 | Ye et al. |
| 9,182,957 | B2 | 11/2015 | Craymer |
| 9,405,797 | B2 | 8/2016 | Eidson et al. |
| 9,690,552 | B2* | 6/2017 | Rong .................. G06F 8/453 |
| 2007/0083730 | A1* | 4/2007 | Vorbach ............ G06F 15/7867 |
| | | | 712/E9.067 |

OTHER PUBLICATIONS

Back et al., "Reasoning algebraically about loops," Acta Informatica, Issue 36(4), Jul. 1999, 40 pages. https://link.springer.com/article/10.1007/s002360050163.

Barton et al., "Generalized Index-Set Splitting," 14th International Conference, CC 2005, Held as Part of the Joint European Conferences on Theory and Practice of Software, ETAPS 2005, Apr. 4-8, 2005, Edinburgh, UK, 15 pages. https://webdocs.cs.ualberta.ca/~amaral/papers/BartonCC05.pdf.

Darte et al., "Loop Shifting for Loop Parallelization", HAL Open Science, Laboratoire de l'Informatique du Parallélisme, submitted Apr. 17, 2019, published May 2000, 43 pages.https://hal-lara.archives-ouvertes.fr/hal-02101749/file/RR2000-22.pdf.

Franchetti et al., "Formal loop merging for signal transforms," ACM SIGPLAN Notices, vol. 40, Issue 6, Jun. 12-15, 2005, Chicago, Illinois, 12 pages. https://dl.acm.org/doi/10.1145/1064978.1065048.

Ghuloum et al., "Flattening and parallelizing irregular, recurrent loop nests," Proceedings of the fifth ACM SIGPLAN symposium on Principles and practice of parallel programming (PPOPP '95), Aug. 1995, Santa Clara, California, 10 pages. https://dl.acm.org/doi/10.1145/209936.209944.

Grelck et al., "Merging Compositions of Array Skeletons in SAC," Parallel Computing: Current & Future Issues of High-End Computing, Proceedings of the International Conference (ParCo 2005), Sep. 13-16, 2005, NIC Series, vol. 33, 10 pages. https://www.researchgate.net/publication/221552609_Merging_Compositions_of_Array_Skeletons_in_SAC.

Kennedy et al., "Maximizing loop parallelism and improving data locality via loop fusion and distribution," International Workshop on Languages and Compilers for Parallel Computing (LCPC 1993), Jan. 1994, published Jan. 1, 2005, 21 pages. https://link.springer.com/chapter/10.1007/3-540-57659-2_18.

Blainey, et al., "Removing Impediments to Loop Fusion Through Code Transformations," Languanges and Compilers for Parallel Computing Lecture Notes in Computer Science, Jan. 1, 2005, pp. 309-328, Springer, Berlin, DE, accessed May 15, 2024, chrome-extension://efaidnbmnnnibpcajpcglclefindmkaj/https://web.eecs.umich.edu/~mahlke/courses/583w23/lectures/Apr3/Group11_paper.pdf.

PCT International Search Report and Written Opinion, dated Apr. 25, 2024, regarding Application No. PCT/EP2024/053999, 16 pages.

Sarkar, "Optimized Unrolling of Nested Loops," Proceedings of the 14th International Conference on Supercomputing, May 8, 2000, pp. 153-166, ACM Press, New York, NY, accessed May 15, 2024, chrome-extension://efaidnbmnnnibpcajpcglclefindmkaj/https://dl.acm.org/doi/pdf/10.1145/335231.335246.

\* cited by examiner

_US 12,271,717 B2_

LOOP INDEX SET MERGING OPTIMIZATION FOR PROGRAM INSTRUCTIONS

BACKGROUND

The disclosure relates generally to an improved computer system and more specifically to loop optimization of program instructions.

Loop optimization is used in computer programming to increase the performance of loops in program instructions. Loops are repetitive blocks of program instructions and can be used to operate on data for some number of times. These operations can include performing calculations, transformations, or other operations on data.

Various optimizations can be performed on loops in program instructions prior to compiling the program instructions to form executable code. These optimizations can be performed to obtain code size reduction, reducing execution time for loops, reducing memory access, increasing code efficiency, and other performance increases.

Loop optimization techniques include loop fusion, loop distribution, loop unroll-and-jam, and other types of loop optimization techniques. Loop fusion involves combining 2 or more loops into a single loop that contains instructions from both loops. Loop distribution involves breaking up a single loop into multiple loops that can be executed in parallel. Loop unroll-and-jam involves unrolling the loop body multiple times with each unroll version executing a subset of the original iterations in the loop. These unrolled loops can then be combined into a single loop.

These types of loop optimization techniques can obtain increased performance for many conventional workloads. These types of workloads include performance computing and scientific computer programs. However, these different types of loop optimizations may not provide the desired optimization of loops in program instructions in all situations.

SUMMARY

According to one illustrative embodiment, a computer implemented method merges loops. A number of processor units identifies loops in computer code. The loops are sequences of instructions that are repeated until conditions for the loops are reached. The number of processor units creates a tree comprising nodes that represent the loops and edges that represent relationships between nodes. The number of processor units utilizes the tree to identify a pair of candidate loops from sibling nodes. The number of processor units creates a new loop from the pair of candidate loops with an expanded iteration space based on iteration spaces for the pair of candidate loops in response to the pair of candidate loops being eligible for merging.

According to other illustrative embodiments, a computer system and a computer program product for merging loops are provided. As a result, the illustrative embodiments provide a technical effect of reducing the code size.

The illustrative embodiments can permissively determine, by the number of processor units, whether the pair of candidate loops is eligible for merging using eligibility factors comprising both loops following structured control flow principle; both loops are monotonically changing and either no intervening code existing between the pair of candidate loops or if the intervening code is present between the pair of candidate loops, the intervening code does not have any dependency on either loop in the pair of candidate loops. As a result, the illustrative embodiments can provide a technical effect of increasing the performance in identifying candidate loops for merging that reduces the code size.

The illustrative embodiments can permissively determine, by the number of processor units, whether to merge the pair of candidate loops to form the new loop using a set of objectives. As a result, the illustrative embodiments provide a technical effect of increasing the performance by identifying candidate loops that provide greater code size reduction.

The illustrative embodiments can permissively analyze the tree to identify the pair of candidate loops from sibling nodes using a reverse breadth first traversal, where the pair of candidate loops are eligible to merge. As a result, the illustrative embodiments provide a technical effect of increasing the performance by identifying larger numbers of candidate loops for merging, resulting in greater code size reduction.

According to another illustrative embodiment, a computer implemented method merges loops. A number of processor units identifies loops in computer code. The loops are sequences of instructions that are repeated until a defined condition is reached. The number of processor units creates a tree comprising nodes for the loops, each of the loops representing a structure of a loop in an intermediate representation. The number of processor units analyzes the tree to identify pair of candidate loops comprising adjacent sibling loops that are eligible to merge. The number of processor units analyzes loop bodies for the candidate loops to identify isomorphic pairs of operations contained in the candidate loops. The number of processor units creates a new loop from the candidate loops, where a loop body of the new loop includes the isomorphic operations obtained from the candidate loops.

According to other illustrative embodiments, a computer system merging loops is provided. As a result, the illustrative embodiments provide a technical effect of reducing code size.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
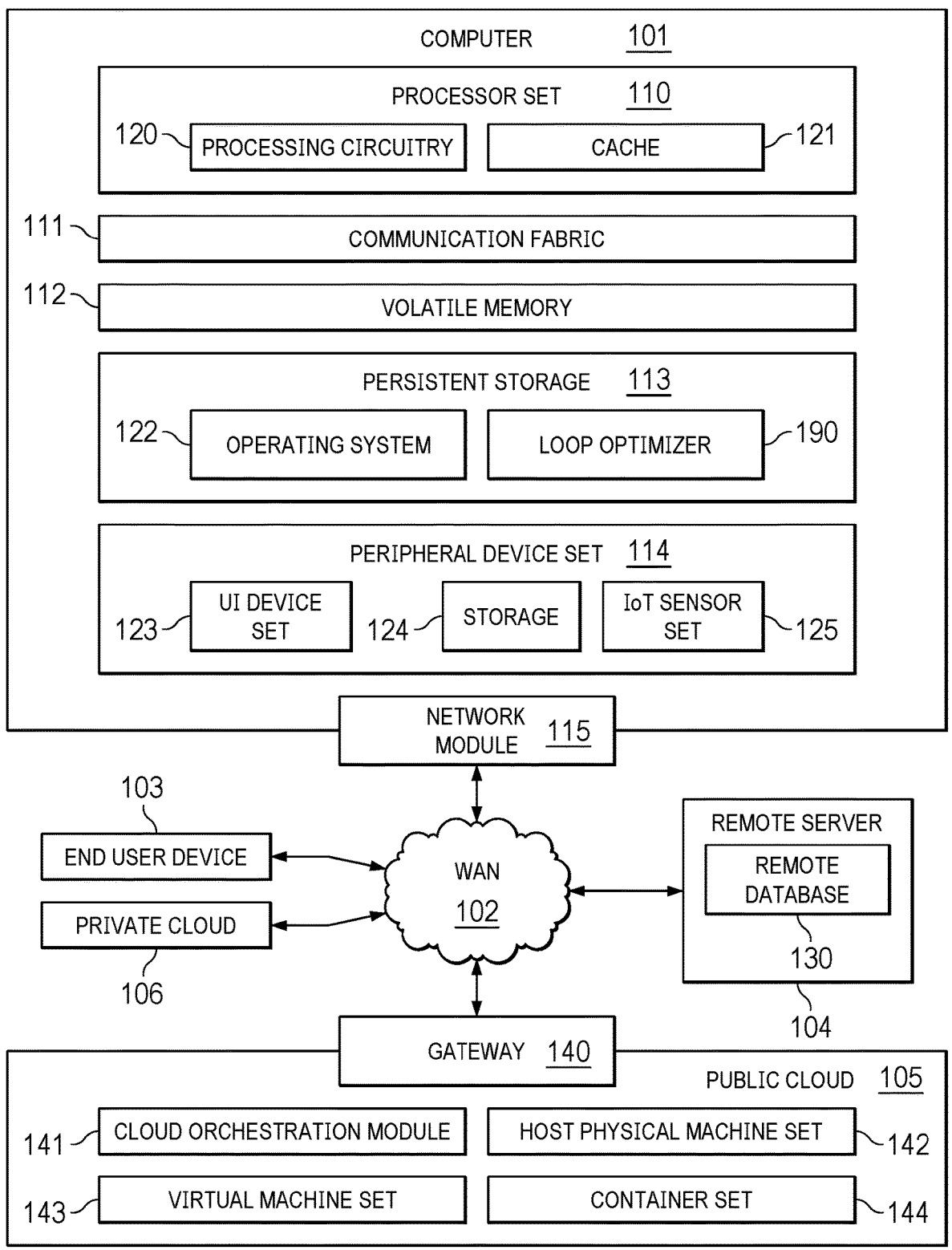
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as loop optimizer 190. In this illustrative example, loop optimizer 190 can optimize program instructions by merging loops that are candidates for merging to In addition to loop optimizer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and loop optimizer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in loop optimizer 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in loop optimizer 190 includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, with the new emphasis and popularity is increasing in fields such as artificial intelligence (AI), domain specific programs, and domain specific languages (DSL).

With these types of languages, compilers of the program instructions are faced with new patterns of instructions that may call for new optimizations to achieve better performance. In the illustrative examples, a loop index set merging (LISM) technique can be employed to perform code size reduction and create opportunities for many other important optimizations in computer programs. These optimizations can be especially useful for programs expressed in AI-DSLs. This type of loop index set optimization can be an additional technique that is useful for both existing types of programs and for technologies such as artificial intelligence.

In one illustrative example, the loop set index merging (LSIM) technique identifies loops in computer code. The loops are sequences of instructions that are repeated until conditions for the loops are reached. The process creates a tree comprising nodes that represent the loops and edges that represent relationships between nodes. The process analyzes the tree to identify a pair of candidate loops among sibling nodes. The process creates a new loop from the pair of candidate loops with an expanded iteration space based on iteration spaces of the pair of candidate loops in response to the pair of candidate loops being eligible for merging. In this example, the expanded iteration space is an iteration space encompassing the iterations for the two candidate loops that are merged into the new loop. The expanded iteration space includes all of the combinations of loop index values that may be nested in the two candidate loops being merged into a new loop.

Figure 2:
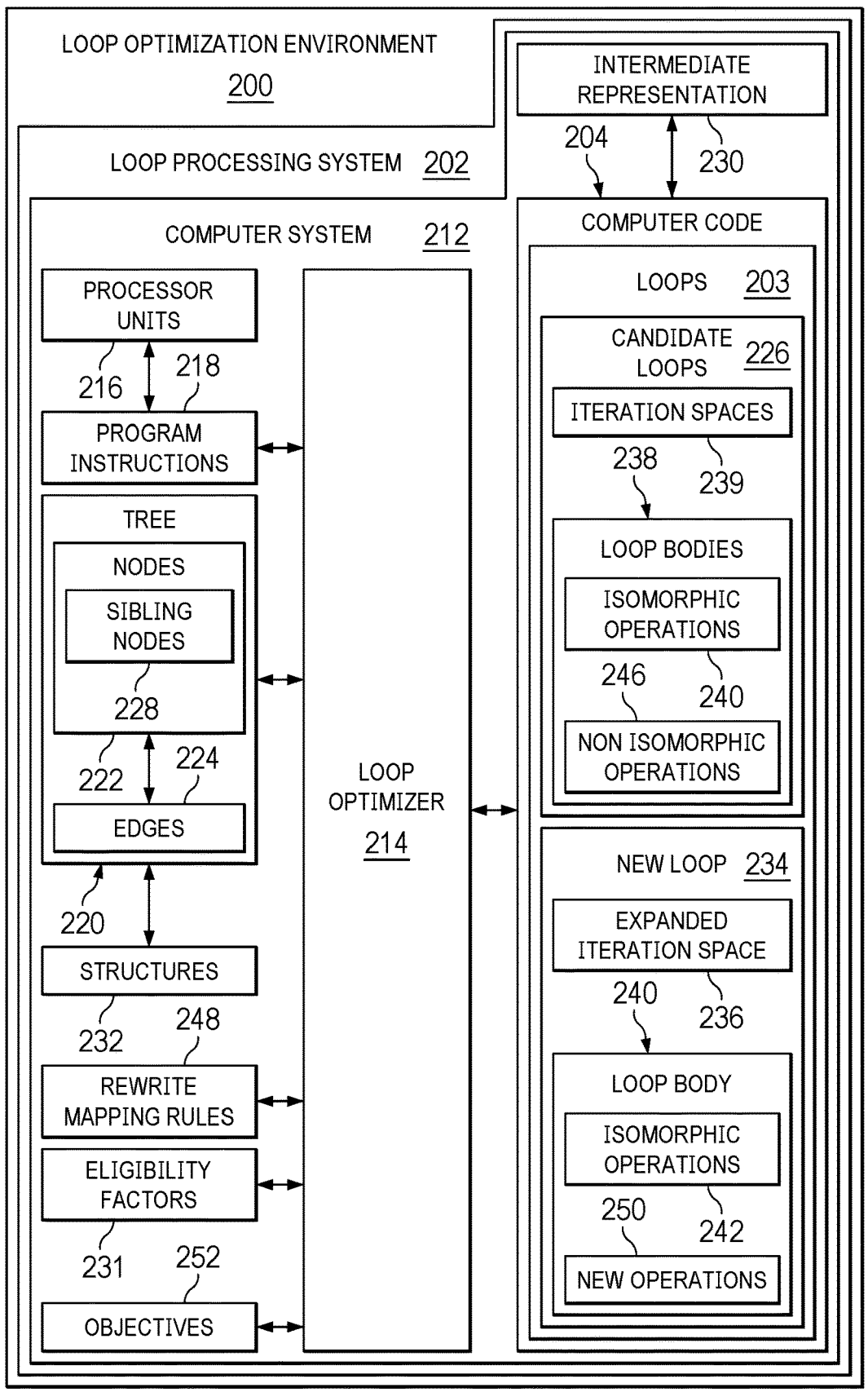
FIG. 2 is a block diagram of a loop optimization environment in accordance with an illustrative embodiment.

With reference now to FIG. 2, a block diagram of a loop optimization environment is depicted in accordance with an illustrative embodiment. In this depicted example, loop optimization environment 200 includes components that can be implemented in hardware such as the hardware shown in computing environment 100 in FIG. 1.

In this illustrative example, loop processing system 202 in loop optimization environment 200 can optimize loops 203 in computer code 204. Computer code 204 comprises a set of instructions or commands written in a programming language. In this example, computer code 204 can be compiled to form executable code for a program or application.

Loop processing system 202 can implement steps for a loop index set merging (LISM) process to combine loops 203 and computer code 204. As depicted, loop processing system 202 comprises computer system 212 and loop optimizer 214. In this example, computer code 204 can be compiled and executed in computer system 212 or in another computer system.

Loop optimizer 214 can be implemented in software, hardware, firmware or a combination thereof. When software is used, the operations performed by loop optimizer 214 can be implemented in program instructions configured to run on hardware, such as a processor unit. When firmware is used, the operations performed by loop optimizer 214 can be implemented in program instructions and data and stored in persistent memory to run on a processor unit. When hardware is employed, the hardware can include circuits that operate to perform the operations in loop optimizer 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process program instructions that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In one illustrative example, loop optimizer 214 can merge loops 203 to increase performance of computer code 204. In optimizing the computer code 204, loop optimizer 214 can identify loops 203 in computer code 204. In this example, loops 203 are sequences of instructions that are repeated until conditions for loops 203 are reached. A loop in loops 203 can also be a nested loop in which the dataflow contains another loop. The loop contained in the nested loop can be referred to as an inner loop.

Loop optimizer 214 creates tree 220 comprising nodes 222 that represent the loops 203 and edges 224 that represent relationships between nodes 222. Tree 220 can be a tree abstraction in which tree 220 is created from intermediate representation (IR) 230 of computer code 204. This intermediate representation can be a form of computer code 204 that is closer to machine code that can be executed by processor units 216. Using an intermediate representation (IR) can make analyzing computer code 204 in tree 220 easier to perform.

In this example, nodes 222 can represent structures 232 for loops 203. For example, a node can include information representing the structure of the loop represented by the node. The structure can include, for example, the identification of index variables and sets of values for the index values variables. In some illustrative examples, the structure can include or point to the program instructions for the loop.

In this illustrative example, loop optimizer 214 analyzes tree 220. For example, loop optimizer 214 analyzes tree 220 to identify a pair of candidate loops 226 from sibling nodes 228 in nodes 222 in tree 220. Further, in this illustrative example, sibling nodes 228 are nodes 222 that share the same parent node. Sibling nodes 228 can be of the same level or depth in tree 220.

Loop optimizer 214 can evaluate the pair of candidate loops 226 to determine whether they are eligible for merging to form new loop 234. In this illustrative example, loop optimizer 214 can perform this evaluation using eligibility factors 231. In this example, eligibility factors 231 for a pair of candidate loops 226 to be eligible for merging comprise are (1) both loops follow structured control flow principles; (2) both loops are monotonically changing; and (3) either no intervening code exists between the pair of candidate loops 226 or if intervening code is present between the pair of candidate loops 226, the intervening code does not have any dependency on either of loop in the pair of candidate loops 226.

In this depicted example, structured control flow principles are principles the loops should follow. These principles can be based on rules or best practices in the field of computer programming. The principles can be based on an idea that the structure of code should be easy to read, understand, and maintain. For example, the pair of loops 203 can be considered to follow structured control flow principles 233 when the pair of loops 203 are natural loops with a single exit. Monotonically changing can mean that the value of the induction variables always increase or always decrease. These induction variables can also be referred to as index variables or indexes for the loops.

In this example, no intervening code means that no code is present between the bodies of the pair of candidate loops 226. Further in this example, no dependency means that the intervening code does not rely on operations in either of the loops.

Other eligibility factors in eligibility factors 231 can include whether the merged loop's upper bound would overflow the target hardware's loop count register. The overflow can be detected at compile-time when the two candidate loops have static trip counts. In other words, these factors can include determining whether errors in execution can occur by merging the pair of candidate loops 226 with each other.

In identifying the pair of candidate loops 226 using sibling nodes 228, loop optimizer 214 can perform this analysis starting at the bottom of tree 220 using a reverse breath first reversal.

Loop optimizer 214 creates new loop 234 from the pair of candidate loops 226 with expanded iteration space 236 based on iteration spaces 239 for the pair of candidate loops 226 in response to the pair of candidate loops 226 being eligible for merging. New loop 234 replaces the pair of candidate loops 226 in loops 203 in computer code 204.

In this illustrative example, an iteration space for a loop in loops 203 refers to the set of all possible values that a set of one or more induction variables can take during the execution of the loop. In other words, an iteration space can include the values for a set of induction variables in a nested loop. Expanded iteration space 236 for new loop 234 comprises all of the values for induction variables in the pair of candidate loops 226. An induction variable is used to track an iteration count in a loop.

Loop optimizer 214 can analyze tree 220 to find additional pairs of sibling nodes 228 and repeat this process. For example, loop optimizer 214 can repeat analyzing tree 220 to identify the pair of candidate loops 226 and creating new loop 234 from the pair of candidate loops 226 for each pair of sibling nodes 228 in tree 220.

In creating new loop 234, loop optimizer 214 can analyze the pair of candidate loops 226. For example, loop optimizer 214 can analyze loop bodies 238 for the pair of candidate loops 226 to identify pairs of isomorphic operations 242 contained in loop bodies 238 for the pair of candidate loops 226. In this illustrative example, an operation is isomorphic to another operation if the operation can be executed in the merged loop unconditionally with respect to the value of the new induction variable of the merged loop. In other words, if the operation can produce a semantically equivalent effect when executed in the expanded iteration space of the merged loop without requiring it to be guarded based on which index set it belongs to, then the operation is isomorphic.

Another way to describe isomorphic operations is that executing either operation produces the same value and/or side-effect. For example, calling a function (without side-effect) at the start of each loop body with the same loop invariant arguments in both loops is considered isomorphic. Another example is if both operations read from a single memory buffer that is filled by an outside process that is synchronized with each load in the program being compiled.

In this illustrative example, loop optimizer 214 creates new loop 234 having loop body 240 that includes isomorphic operations 242 from the pairs of isomorphic operations 242 identified in the pair of candidate loops 226.

Additionally, non-isomorphic operations 246 can be present in loop bodies 238. In this example, loop optimizer 214 can apply rewrite mapping rules 248 to create new operations 250 for loop body 240 in new loop 234 using non-isomorphic operations 246 and loop bodies 238 from candidate loops 226. Loop optimizer 214 can also apply rewrite mapping rules 248 to create new operations 250 from isomorphic operations 242 in some cases.

In another illustrative example, when a pair of candidate loops 226 is determined to be eligible for merging, additional analysis can be made with respect to whether to merge the pair of candidate loops 226 using a set of objectives 252. The set of objectives can include at least one of code size reduction, granularity of parallelism, perfect loop nest creation, a service level objective for the computer code, threshold for isomorphic to non-isomorphic operations, or other objectives.

For example, loop optimizer 214 can determine a ratio of isomorphic operations 242 to non-isomorphic operations 246 for the pair of candidate loops 226. Loop optimizer 214 can determine whether to create new loop 234 from the pair of candidate loops 226 based on whether the ratio of ratio of isomorphic operations 242 to non-isomorphic operations 246 is greater than a threshold.

In one illustrative example, one or more technical solutions are present that overcome a technical problem with optimizing code containing loops. As a result, one or more technical solutions may provide a technical effect providing a method for merging loops in a manner that reduces code size. In one or more illustrative examples, candidate loops are identified from sibling nodes in a tree in which the nodes represent loops and the edges represent their nesting and relationships with other loops. Candidate loops are evaluated to determine whether the candidate loops are eligible to be merged. Candidate loops that are eligible to be merged can also be evaluated to determine whether merging those loops will meet a set of objectives.

When a determination is made to merge the candidate loops, a new loop is created with an expanded iteration space that encompasses the iteration space of each of the loops being merged into the new loop. Additionally, pairs of isomorphic operations are identified in the candidate pairs of loops. These operations are included in the body of the new loop some cases may involve some rewriting. If non-isomorphic operations are present, these non-isomorphic operations are rewritten in the body of the new loop using rewrite mapping rules. The old loops are removed and the new loop is added to the code.

A similar change can be made with respect to the tree representing the loops in the code. This updated tree can then be further analyzed to determine whether sibling nodes are present for use in determining another pair of candidate loops can be merged. This process can greatly increase the reduction in code size.

Computer system 212 can be configured to perform at least one of the steps, operations, or actions described in the different illustrative examples using software, hardware, firmware or a combination thereof. As a result, computer system 212 operates as a special purpose computer system in which loop optimizer 214 in computer system 212 enables merging loops to reduce code size. In particular, loop optimizer 214 transforms computer system 212 into a special purpose computer system as compared to currently available general computer systems that do not have loop optimizer 214.

In the illustrative example, the use of loop optimizer 214 in computer system 212 integrates processes into a practical application for method merging loops in a manner that reduces code size, resulting in increases to the performance of computer system 212. In other words, loop optimizer 214 in computer system 212 is directed to a practical application of processes integrated into loop optimizer 214 in computer system 212. For example, loop optimizer 214 in computer system 212 provides a practical application of steps to merge loops such that the functioning of computer system 212 is improved. Computer system 212 can optimize computer code that is run on a computer system 212 using the loop optimizer 214 to merge loops in computer code. With a reduction in code size, increased resource availability can be present in computer system 212. At least one of a reduction in memory use, an increase in execution speed of code, or other improvements can occur.

The illustration of loop optimization environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, loop optimizer 214 can perform loop optimization on additional computer code in addition to computer code 204 in which the additional computer code are in different source languages. In other illustrative examples, computer code 204 can already be in an intermediate representation of code.

Figure 3:
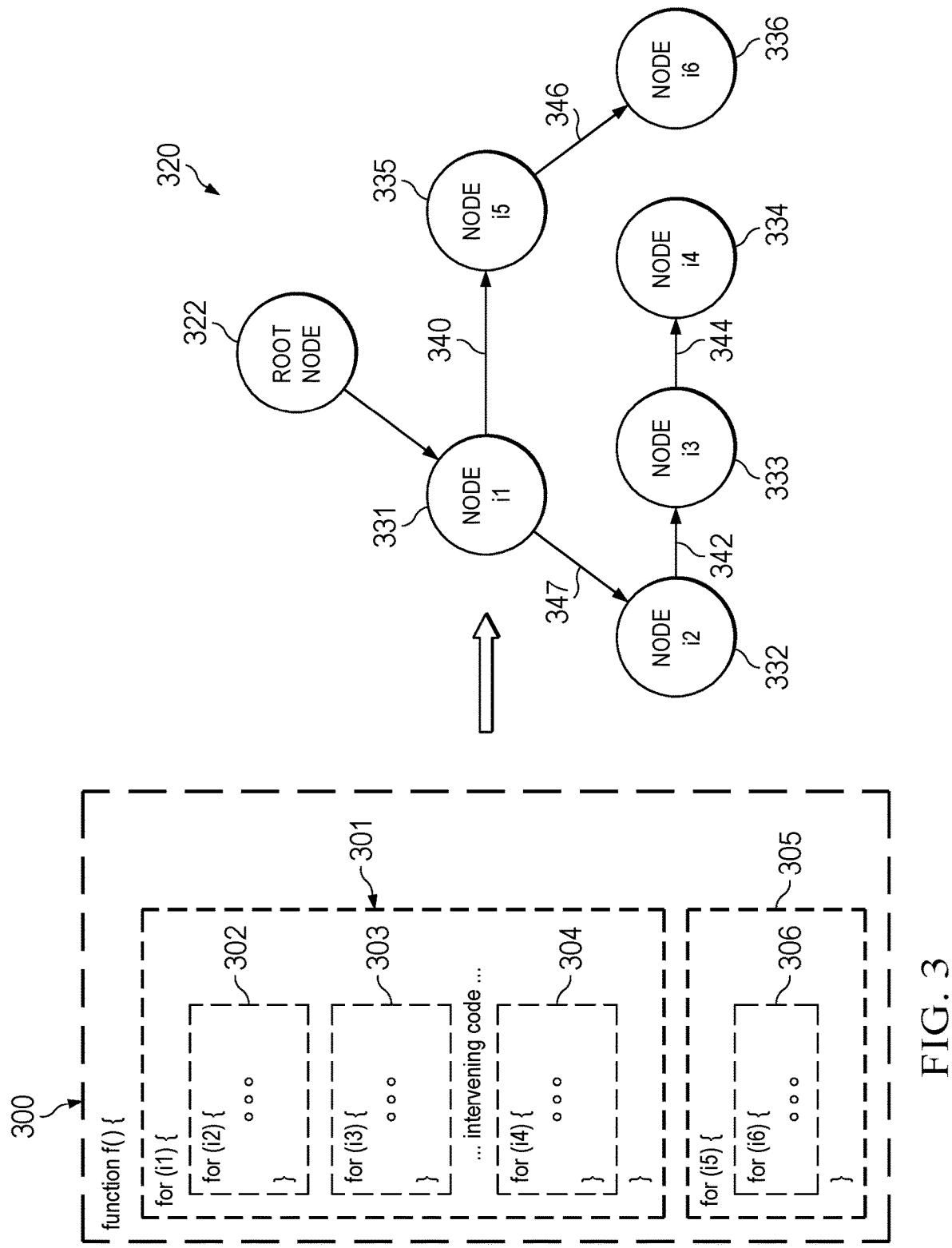
FIG. 3 is a flow diagram illustrating the creation of a tree from computer code in accordance with an illustrative embodiment.

With reference now to FIG. 3, a flow diagram illustrating the creation of a tree from computer code is depicted in accordance with an illustrative embodiment. As depicted, code 300 is an example of an intermediate representation of computer code such as computer code 204 in FIG. 2. As depicted, code 300 is for a function in a program or application. Code 300 contains loops that can be used to create tree 320.

In this illustrative example, loops in code 300 have different depths. The depth of a loop is the level of nesting of loops. As depicted, loop i2 302, loop i3 303, and loop i4 304 are nested within loop i1 301. Loop i6 306 is nested within loop i5 305. In this example, loop i1 301 and i5 305 are at the same depth. Further, loop i2 302, loop i3 303, loop i4 304, and loop i6 306 are at the same depth.

As depicted, the loops in code 300 can have a parent-child relationship and a sibling relationship. For example, parent-child relationship is present when child loop is nested in a parent. With a sibling relationship, both loops are at the same depth while at the same nesting level within code 300. Two loops are at the same nesting level within code 300 when the two loops are at the same level of hierarchy within code 300 structure and enclosed by the same pair of curly braces: "{" and "}" in this example.

For example, loop i1 301 and loop i5 305 have a sibling relationship because these two loops are at the same level of hierarchy and both enclosed by the function f( ). In addition, loop i2 302, loop i3 303, and loop i4 304 have sibling relationships because these three loops are all nested within loop i1 301 at the same depth.

In this example, loop i6 306 does not have a sibling relationship with loop i2 302, loop i3 303, and loop i4 304 because loop i6 306 is nested within a different loop. In this example, loop i1 301 has a parent-child relationship with loop i2 302, loop i3 303, and loop i4 304 because these loops are child loops nested within loop i1 301, which is the parent loop. As depicted, loop i5 305 has a parent-child relationship with loop i6 306 because loop i6 306 is a child loop nested within loop i5 305, which is the parent loop.

As depicted, tree 320 is created using code 300. Tree 320 has nodes representing structures of the loops in code 300. Tree 320 has root node 322 indicating that tree 320 is a tree for code 300. The nodes in tree 320 below root node 322 are representations of the loops in code 300.

These nodes are arranged in levels with edges that identify the relationship of the nodes in code 300 to each other. With respect to the levels, node i1 331 and node i5 335 are at the same level below root node 322. As depicted, node i2 332, node i3 333, node i4 334, and node i6 336 are at the same level.

In this depicted example, the edges represent relationships between the nodes. These edges with the levels of the nodes can be used to identify parent-child relationships and sibling relationships for nodes in tree 320. For example, edge 340 connects node i1 331 and node i5 335. In this example, these two nodes are also on the same level. As result, node i1 331 and node i5 335 are sibling nodes.

As depicted, edge 342 connects node i2 332 to node i3 333; edge 344 connects node i3 333 to node i4 334. These three nodes are on the same level. As result, these nodes have sibling relationships to each other. These nodes are also child nodes to node i1 331 based on the connection of node i1 331 to node i2 332 by edge 347 and the location of these nodes in tree 320 at a level below node i1 331.

Although node i6 336 is on the same level as node i2 332, node i3 333, and node i4 334, node i6 336 does not have a sibling relationship with these nodes because of an absence of a connection with these nodes. Node i5 335 is connected to node i6 336 by edge 346. This connection means that node i5 335 is a parent node to node i6 336, which is a child node to this parent node.

In this example, tree 320 can be analyzed to identify sibling nodes that correlate to pairs of loops that can be considered to determine whether those candidate loops can be merged. In the illustrative example, the traversal of the tree is performed from the bottom level upwards and breadth first. Although tree 320 can be traversed in different ways, bottom-up breadth first can provide increased opportunities for merging loops as compared to other techniques for traversing tree 320.

Figure 4:
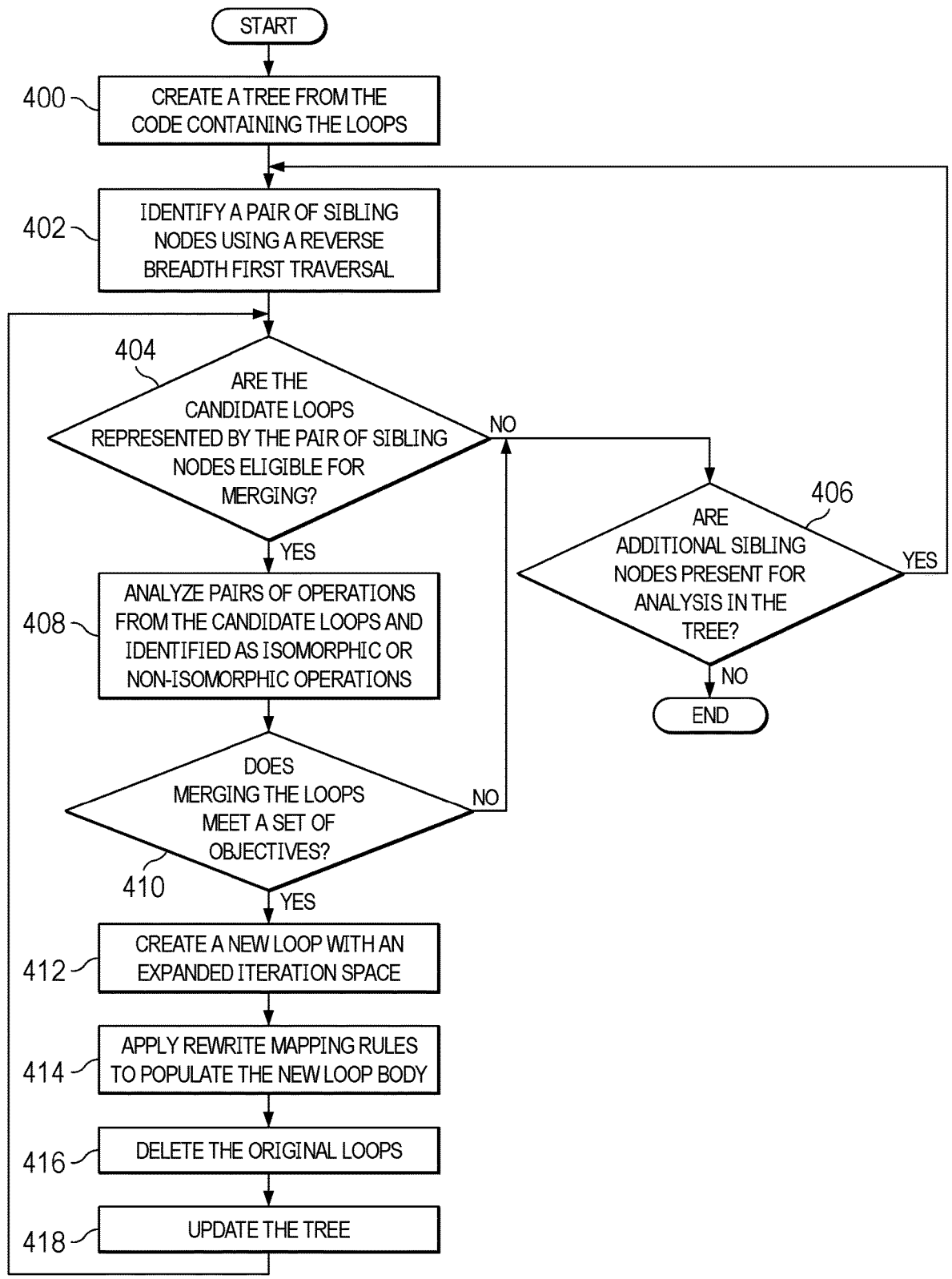
FIG. 4 is a flowchart of a process for merging loops using a tree representation of the loops in accordance with an illustrative embodiment.

Turning next to FIG. 4, a flowchart of a process for merging loops using a tree representation of the loops is depicted in accordance with an illustrative embodiment. The process in FIG. 4 can be implemented in hardware, software, or both. When implemented in software, the process can take the form of program instructions that are run by one or more processor units located in one or more hardware devices in one or more computer systems. For example, the process can be implemented in loop optimizer 214 in computer system 212 in FIG. 4.

The process begins by creating a tree from the code containing the loops (step 400). This code can be an application, a program, a function, a subroutine, or other computer code. Further, the code used can be the source code or can be an intermediate representation of the source code.

The process identifies a pair of sibling nodes using a reverse breadth first traversal (step 402). In step 402, the traversal starts at the bottom of the tree and works its way upward.

The process determines whether the candidate loops represented by the pair of sibling nodes are eligible for merging (step 404). In step 404, this determination can be made a number of different ways. For example, the determination for eligibility can be present when (1) both loops follow structured control flow principles; (2) both lops are either monotonically increasing or decreasing; and (3) either no intervening code exists between the two candidate loops or the intervening code has no dependency with either of the candidate loops.

If the candidate loops are not eligible for merging, a determination is made as to whether additional sibling nodes are present for analysis in the tree (step 406). If additional sibling nodes are not present, the process terminates. If additional sibling nodes are present, the process returns to step 402.

With reference again to step 404, if the candidate loops are eligible for merging, pairs of operations from the candidate loops are analyzed and identified as isomorphic or non-isomorphic operations (step 408). In step 408, the determination as to whether operations are isomorphic can be performed by checking to determine whether opcodes or instructions match and then recursively check if their operands are isomorphic.

The process determines whether merging the loops meets a set of objectives (step 410). In step 410, these objectives can be, for example, whether the merging will reduce the code size sufficiently. One manner in which this determination can be made is to analyze the number of operations that are isomorphic operations between two loops. For example, if all of the pairs of operations are isomorphic, the two loops are fully isomorphic and the objective is met. In another example, a ratio of isomorphic to non-isomorphic operations can be calculated. If this ratio is greater than a threshold, then this objective is also met.

If the set of objectives are not met, the process returns to step 406. Otherwise, the set of objectives are met and the process creates a new loop with an expanded iteration space (step 412). In step 412, the new loop has an expanded iteration space with an empty body. In this example, the expanded iteration space is an iteration space that encompasses iteration space from the two candidate nodes that are merged to form the new node. The iteration space of each candidate loop can be represented as the range of values that the loop's induction variable can take during runtime execution of that loop. The induction variable is an integer variable that can be incremented or decremented by constant count at each iteration of the loop. This variable can also be referred to as an index or index variable. The range of values that the induction variable can take is referred to as an index set of the loop.

In step 412, the process can use an index mapping function to translate the uses of indices of the original loops into equivalent values based on the new induction variable. Such a function takes into account differences in strides and lower bounds and upper-bounds of the loops being merged. A loop can have multiple induction variables, in which case an index mapping can be applied to each induction variable in a similar fashion.

The process applies rewrite mapping rules to populate the new loop body (step 414). In step 414, rewrite mapping rules can be applied to guard non-isomorphic operations such that these types of operations are executed only in the portion of the merged index set that corresponds to their original loop. In applying the rewrite mapping rules, the process can also change any uses of the induction variables through a mapping that translates them to the correct value based on the new induction variable. The mapping can be provided as a function that takes the new induction variable as input and computes a resulting index based on the lower-bound, upper-bound and stride of the original loops.

In the case of fully isomorphic loops, the index mapping is either not necessary (e.g. when induction variables are not used other than for counting the iterations) or would be a direct mapping from the old induction variable to the corresponding new induction variable. In cases of loops with multiple induction variables, a direct mapping can also be applied to each of the pairs of induction variables as long as the strides match for the pair of induction variables mapping to each other.

The process deletes the original loops (step 416). The process updates the tree (step 418). The process then returns to step 404 as described above. In step 418, the process removes the two sibling nodes and replaces the two sibling nodes with the new node. Thus, the process in this flowchart can merge pairs of loops one at a time until no more candidate loops are present for consideration.

Figure 5:
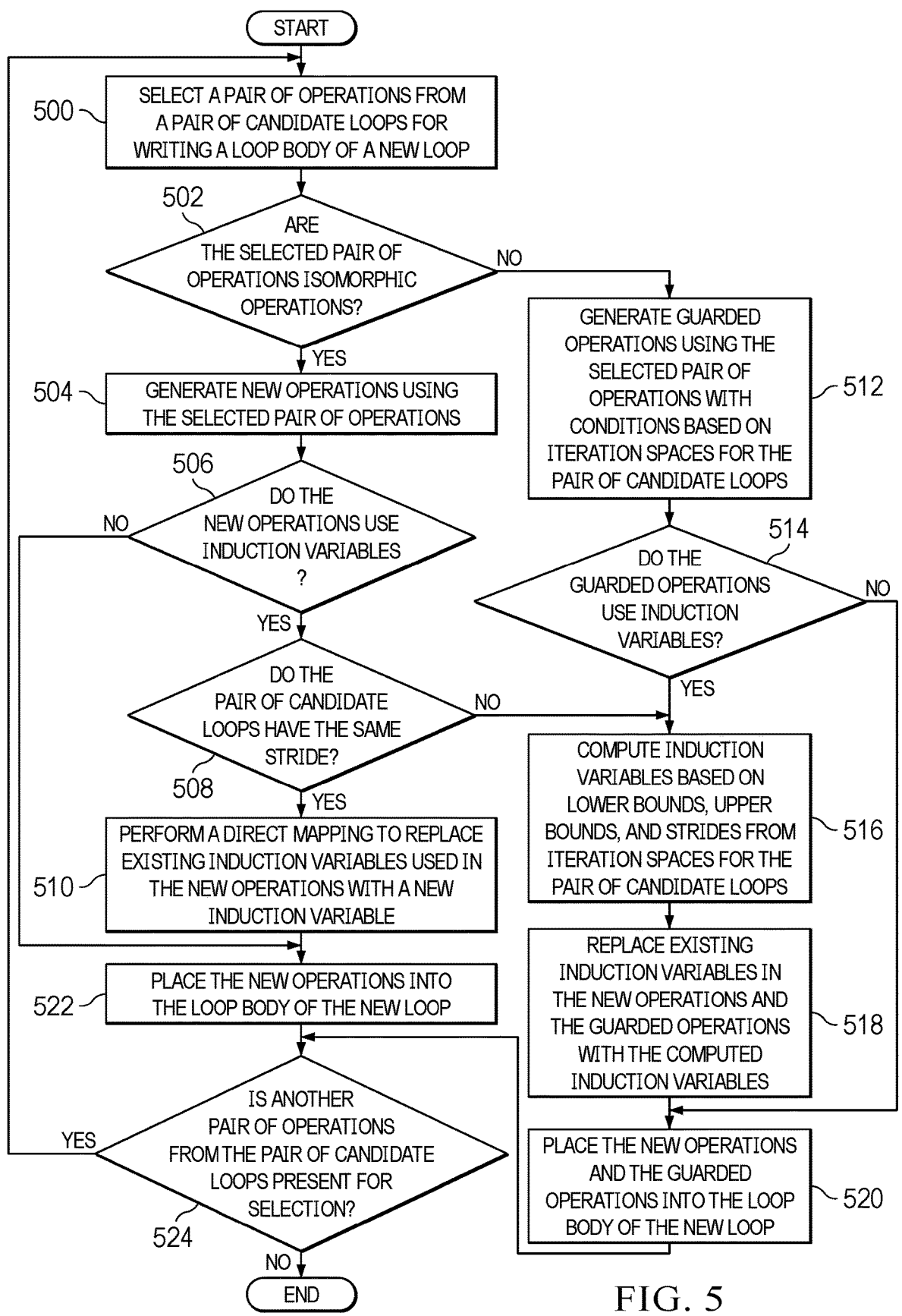
FIG. 5 is a flowchart of a process for applying rewrite mapping rules to create new operations for a loop body of a new loop in accordance with an illustrative embodiment.

With reference to FIG. 5, a flowchart of a process for applying rewrite mapping rules to create new operations for a loop body of a new loop is depicted in accordance with an illustrative embodiment. The process in FIG. 5 can be implemented in hardware, software, or both. When implemented in software, the process can take the form of program instructions that are run by one of more processor units located in one or more hardware devices in one or more computer systems. For example, the process can be implemented in loop optimizer 214 in loop processing system 202 in FIG. 2. The process in FIG. 5 is an example of one implementation for step 414 in FIG. 4.

The process begins by selecting a pair of operations from a pair of candidate loops for writing a loop body of a new loop (step 500). In step 500, the process compares operations in loop bodies from the two candidate loops to each other. The process determines whether the selected pair of operations are isomorphic operations (step 502).

If the selected pair of operations are isomorphic operations, the process generates new operations using the selected pair of operations (step 504). The new operations created in step 504 can be a copy of the selected pair of operations. For example, if the selected pair of operations includes isomorphic operation A( ) and isomorphic operation B( ), the operations created for the loop body of the new loop can be A( ) and B( ).

The process determines whether the new operations use induction variables (step 506). In step 506, induction variables are indices used to track the number of iterations performed by a loop. For example, an operation that does not use induction variable can be A( ) and an operation that uses induction variable can be A(i). In this example, A( ) is the operation to be executed in a loop and "i" is the induction variable that tracks the number of iterations performed by the loop.

If the new operations use induction variables, the process determines whether the pair of candidate loops have the same stride (step 508). In step 508, strides are values that are added or removed to induction variable in a loop after each iteration.

If the pair of candidate loops have the same stride, the process performs a direct mapping to replace existing induction variables used in the new operations with a new induction variable (step 510). In step 510, the direct mapping can be performed by renaming an induction variable used in the operations created for the loop body of the new loop.

For example, if a pair of operations from the candidate loops includes isomorphic operation A(i) from a first loop in the pair of candidate loops and isomorphic operation A(j) from a second loop in the pair of candidate loop, the process can rename induction variables "i" an "j" to induction variable "k", k is the induction variable of the new (merged) loop. In this example, the old induction variable is replaced with the induction variable of the new loop.

This rewrite can be used with loops containing isomorphic operations that use induction variables in which the two loops have disjoint but consecutive index sets. In this example, direct mapping of induction variables translates the induction variables used in the operations to correct values and ensures the new operations in the new loop are executed correctly.

The process places the new operations into the loop body of the new loop (step 522). With reference again to step 506, if the new operations do not use induction variables, the process also proceeds to step 522. The process determines whether another pair of operations from the pair of candidate loops is present for selection (step 524). If another pair of operations from the pair of candidate loops is present, the process returns to step 500 and repeats the steps from step 500 to step 524 until all pairs of operations from the pair of candidate loops have been selected. If another pair of operations is not present, the process terminates thereafter.

With reference again to step 502, if the selected pair of operations are non-isomorphic operations, the process generates guarded operations using the selected pair of operations with conditions based on iteration spaces for the pair of candidate loops (step 512). In step 512, the guarded operations are executed only in the portion of the merged index set that corresponds to the original loop on which the guarded operations are based. In other words, the guarded operations are conditionally executed based on iteration space for non-isomorphic operations' corresponding loop in the pair of candidate loops.

For example, if the selected pair of operations is non-isomorphic, involving operations A( ) and B( ) from a first and a second loop, respectively, and the first loop's index values range from 0 to n−1 and the second loop's index values range from n to m, the guarded operations include A( ) that executes only when induction variables in the new loop is less than n since induction variable only iterates from 0 to n−1 in the first loop. In addition, the guarded operations also include operation B( ) that executes only when induction variables in the new loop is greater than n−1 and less than m since induction variable only iterates from n to m in the second loop.

The process determines whether the guarded operations use induction variables (step 514). If the guarded operations use induction variables, the process computes induction variables based on lower bounds, upper bounds, and strides from iteration spaces for the pair of candidate loops (step 516). With reference again to step 508, if the pair of candidate loops do not have the same stride, the process also proceeds to step 516.

The process replaces existing induction variables in the new operations and the guarded operations with the computed induction variables (step 518). The process places the new operations and the guarded operations into the loop body of the new loop (step 520). With reference again to step 514, if the guarded operations do not use induction variables, the process also proceeds to step 520. The process then proceeds to step 524 as described above.

Figure 6:
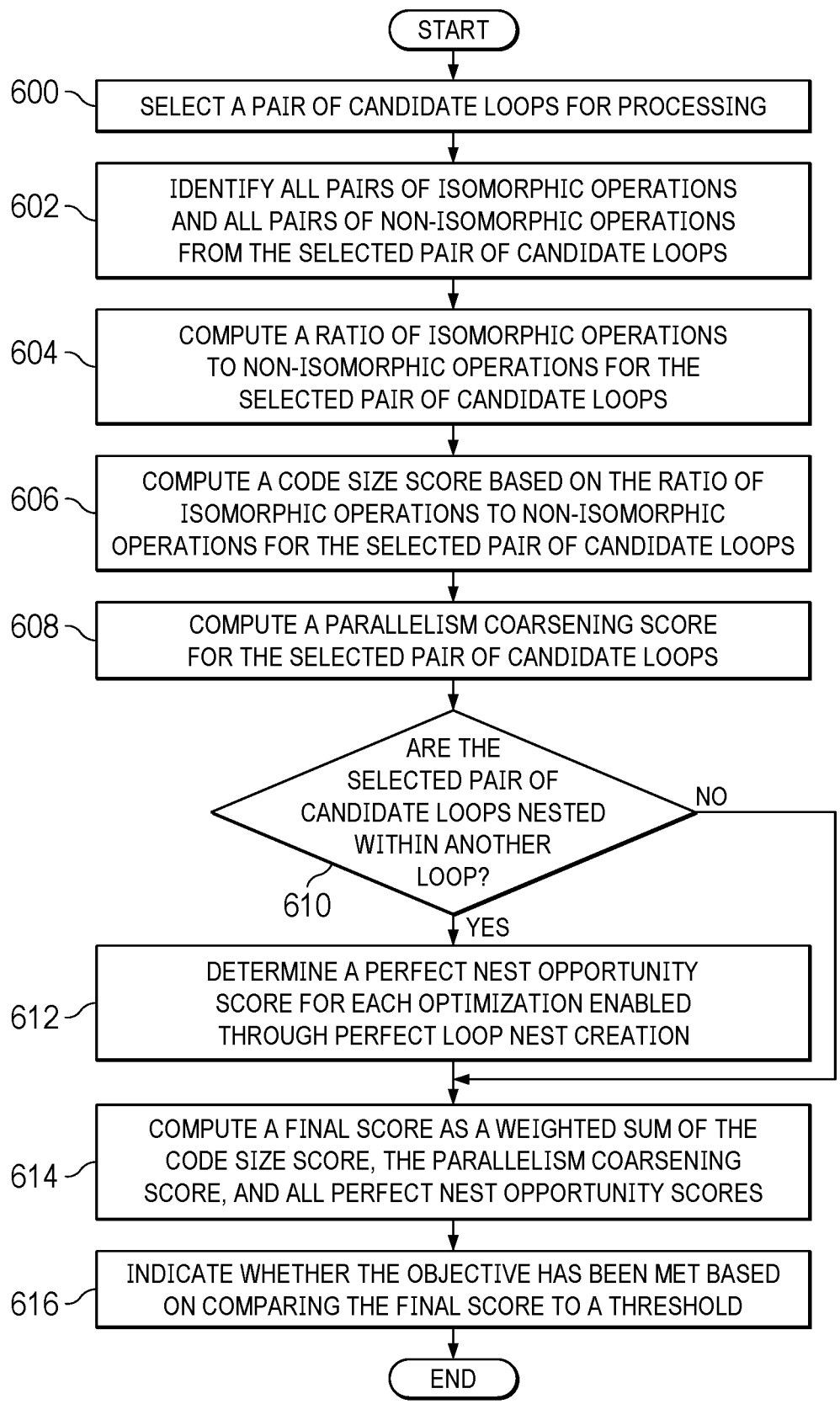
FIG. 6 is a flowchart of a process for determining whether merging a pair of candidate loops meets an objective in accordance with an illustrative embodiment.

With reference to FIG. 6, a flowchart of a process for determining whether merging a pair of candidate loops meets an objective is depicted in accordance with an illustrative embodiment. The process in FIG. 6 is an example of an implementation for step 410 in FIG. 4.

The process begins by selecting a pair of candidate loops for processing (step 600). The process identifies all pairs of isomorphic operations and all pairs of non-isomorphic operations from the selected pair of candidate loops (step 602).

The process computes a ratio of isomorphic operations to non-isomorphic operations for the selected pair of candidate loops (step 604). The process computes a code size score based on the ratio of isomorphic operations to non-isomorphic operations for the selected pair of candidate loops (step 606). In step 606, the code size score is a measure used to determine potential reduction in size of computer code that can result from merging the pair of candidate loops. In this example, merging the pair of candidate loops with isomorphic operations can lead to reduction in size of the computer code because isomorphic operations are identical in at least one of structure or form.

The process computes a parallelism coarsening score for the selected pair of candidate loops (step 608). Parallelism coarsening score is a measure of potential increase in performance for the computer code. Parallelism coarsening is a technique to combine multiple tasks or operations into larger units that can be executed in parallel. In other words, a higher parallelism coarsening score for a pair of candidate loops indicates that the pair of candidate loops have greater potential for parallelism coarsening, and therefore may benefit from merging the pair candidate loops into a single new loop.

In step 608, the parallelism coarsening score can be determined based on an estimated trip count, estimated compute cycles of instruction in loop body, and an estimated parallelization overhead. In this example, the trip count is the number of times that a loop executes, and compute cycles of instruction in the loop body is the number of clock cycles used to execute instructions in the loop body. In addition, parallelization overhead is the additional time and resources required to break down a loop into smaller tasks such that different portions of the loop can be executed simultaneously on different processor units.

The process determines whether the selected pair of candidate loops are nested within another loop (step 610). If the selected pair of candidate loops are nested within another loop, the process determines a perfect nest opportunity score for each optimization enabled through perfect loop nest creation (step 612). In step 612, a perfect loop nest is a nested loop that contains all operations in the innermost loop. In this illustrative example, a perfect loop nest is a loop nest where all the useful computations (computations other than the loop overhead) happen inside the innermost loop. In other words, no intervening code exists between any two loops. With reference again to step 610, if the selected pair of candidate loops are not nested within another loop, the process proceeds directly to step 614, as described below.

The process computes a final score as a weighted sum of the code size score, the parallelism coarsening score, and all perfect nest opportunity scores (step 614). In step 614, the final score can be determined as follows: final score=code-size-score*w1+parallelism-coarsening-score*w2+perfect-nest-op1*w3+perfect-nest-op2*w4+ . . . . With this example, weights such as w1, w2, w3, w,4 . . . can be applied to the different scores to adjust the effect of each score on the final result.

The process indicates whether the objective has been met based on comparing the final score to a threshold (step 616). The process terminates thereafter. In step 616, If the final score is greater than the threshold, the process indicates that objective has been met with respect to increases in execution speed, code size reduction, or both increases in execution speed and code size reduction. In this depicted example, the threshold can have a value such as one. Otherwise, the process indicates that the objective has not been met.

Figure 7:
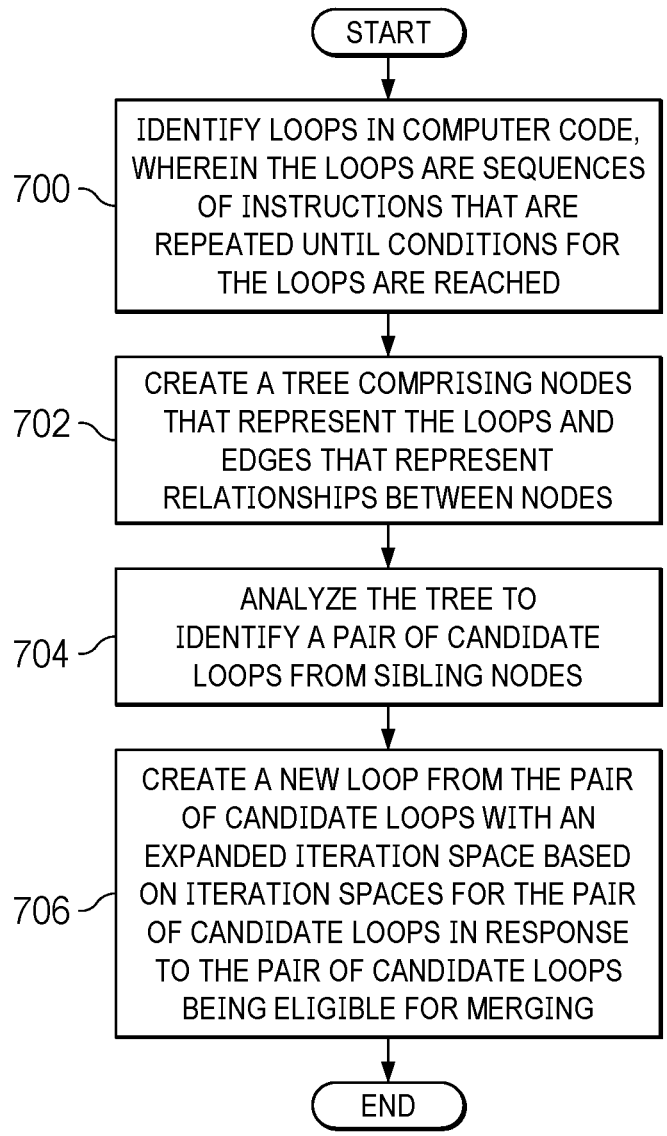
FIG. 7 is a flowchart of a process for merging loops in accordance with an illustrative embodiment.

Turning next to FIG. 7, a flowchart of a process for merging loops is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in loop optimizer 214 in computer system 212 in FIG. 2.

The process begins by identifying loops in computer code, wherein the loops are sequences of instructions that are repeated until conditions for the loops are reached (step 700). The process creates a tree comprising nodes that represent the loops and that edges represent relationships between nodes (step 702). In step 702, the nodes in the tree can represent structures for loops in an intermediate representation.

The process analyzes the tree to identify a pair of candidate loops from sibling nodes (step 704). The process creates a new loop from the pair of candidate loops with an expanded iteration space based on iteration spaces for the pair of candidate loops in response to the pair of candidate loops being eligible for merging (step 706). The process terminates thereafter.

Figure 8:
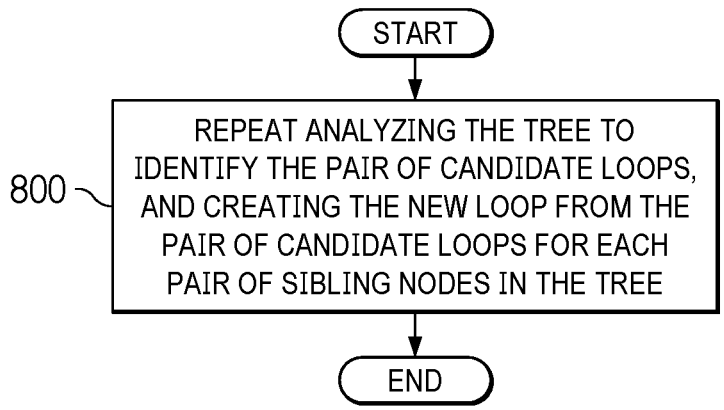
FIG. 8 is a flowchart of a process for merging loops in accordance with an illustrative embodiment.

With reference to FIG. 8, a flowchart of a process for merging loops is depicted in accordance with an illustrative embodiment. The process illustrated in FIG. 8 is an example of an additional step that can be performed with the steps in FIG. 7.

The process repeats analyzing the tree to identify the pair of candidate loops; and creating the new loop from the pair of candidate loops for each pair of sibling nodes in the tree (step 800). The process terminates thereafter.

Figure 9:
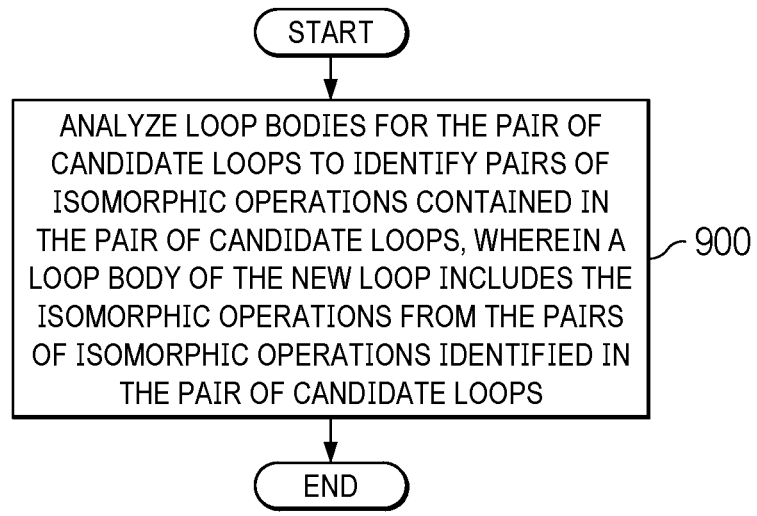
FIG. 9 is a flowchart of a process for analyzing loops in accordance with an illustrative embodiment.

Next in FIG. 9, a flowchart of a process for analyzing loops is depicted in accordance with an illustrative embodiment. The process in this figure is an example of an additional step that can be performed with the steps in FIG. 7.

The process analyzes loop bodies for the pair of candidate loops to identify pairs of isomorphic operations contained in the pair of candidate loops, wherein a loop body of the new loop includes the isomorphic operations from the pairs of isomorphic operations identified in the pair of candidate loops (step 900). The process terminates thereafter.

Figure 10:
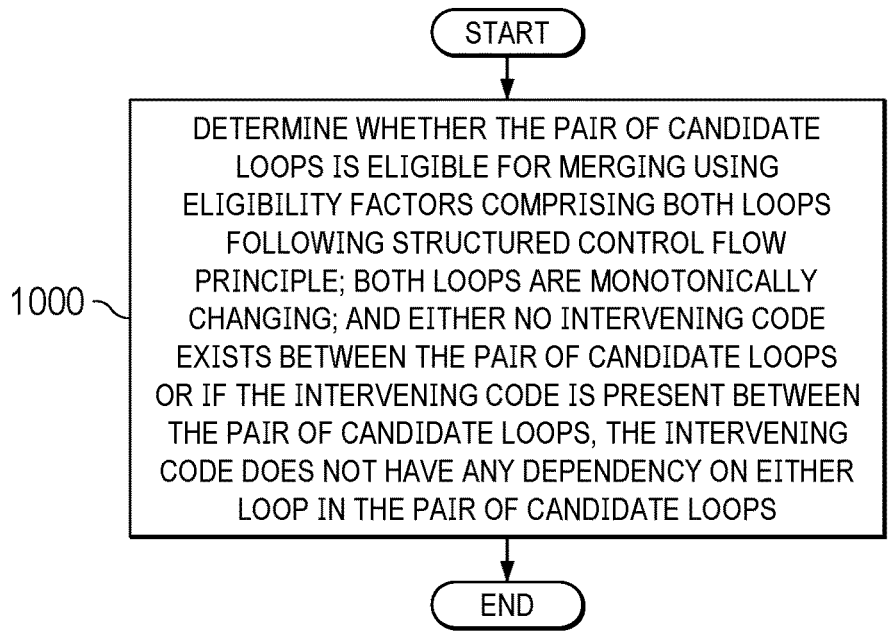
FIG. 10 is a flowchart of a process for determining whether a pair of candidate loops is eligible for merging in accordance with an illustrative embodiment.

With reference now to FIG. 10, a flowchart of a process for determining whether a pair of candidate loops is eligible for merging is depicted in accordance with an illustrative embodiment. The process in this figure is an example of an additional step that can be performed with the steps in FIG. 7.

The process determines whether the pair of candidate loops is eligible for merging using eligibility factors comprising both loops following structured control flow principle; both loops are monotonically changing; and either no intervening code exists between the pair of candidate loops or if the intervening code is present between the pair of candidate loops, the intervening code does not have any dependency on either loop in the pair of candidate loops (step 1000). The process terminates thereafter.

Figure 11:
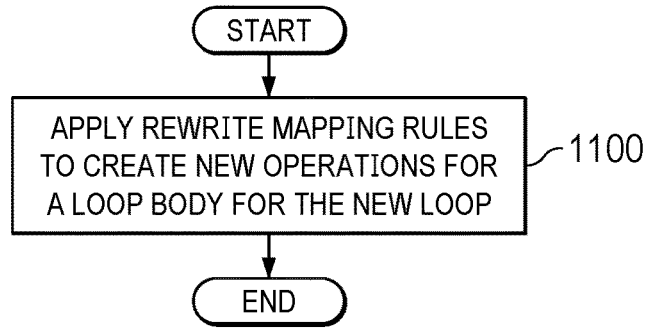
FIG. 11 is a flowchart of a process for creating a new loop in accordance with an illustrative embodiment.

Turning next to FIG. 11, a flowchart of a process for creating a new loop is depicted in accordance with an illustrative embodiment. The process in FIG. 11 is an example of an implementation for step 706 in FIG. 7.

The process applies rewrite mapping rules to create new operations for a loop body for the new loop (step 1100). The process terminates thereafter. Index mapping may still be required for some isomorphic operations. These mappings are usually simpler as compared to non-isomorphic operations. For example, the mapping can be direct mapping.

Figure 12:
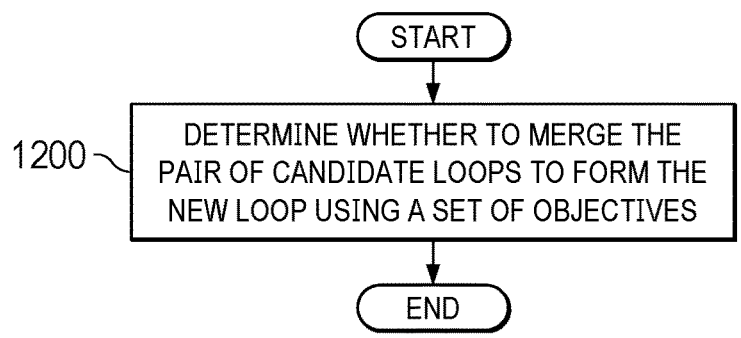
FIG. 12 is a flowchart of a process for determining whether to merge a pair of candidate loops in accordance with an illustrative embodiment.

With reference now to FIG. 12, a flowchart of a process for determining whether to merge a pair of candidate loops is depicted in accordance with an illustrative embodiment. The process in FIG. 12 is an example of an additional step that can be performed with the steps in FIG. 7.

The process determines whether to merge the pair of candidate loops to form the new loop using a set of objectives (step 1200). The process terminates thereafter.

Figure 13:
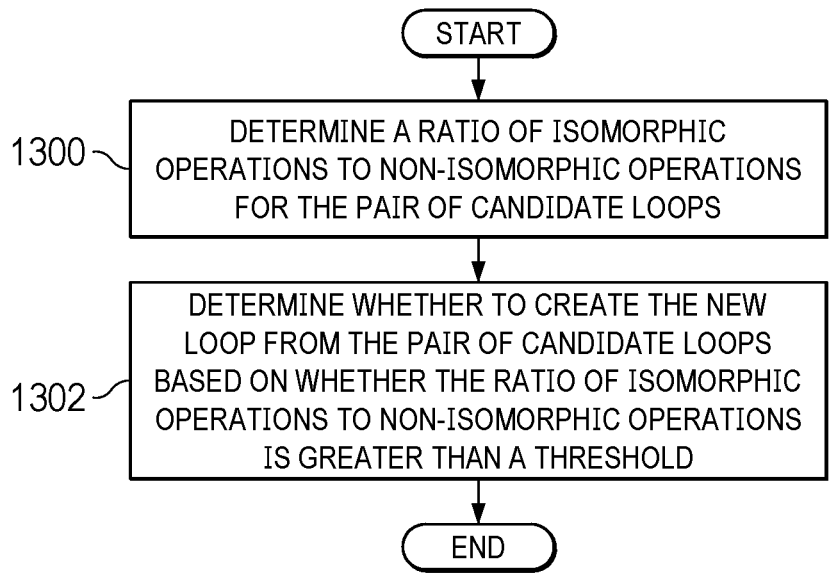
FIG. 13 is a flowchart for determining whether to merge a pair of candidate loops in accordance with an illustrative embodiment.

Turning next to FIG. 13, a flowchart for determining whether to merge a pair of candidate loops is depicted in accordance with an illustrative embodiment. The process in this flowchart is an example of additional steps that can be performed with the steps in FIG. 7.

The process begins by determining a ratio of isomorphic operations to non-isomorphic operations for the pair of candidate loops (step 1300). The process determines whether to create the new loop from the pair of candidate loops based on whether the ratio of isomorphic operations to non-isomorphic operations is greater than a threshold (step 1302). The process terminates thereafter.

Figure 14:
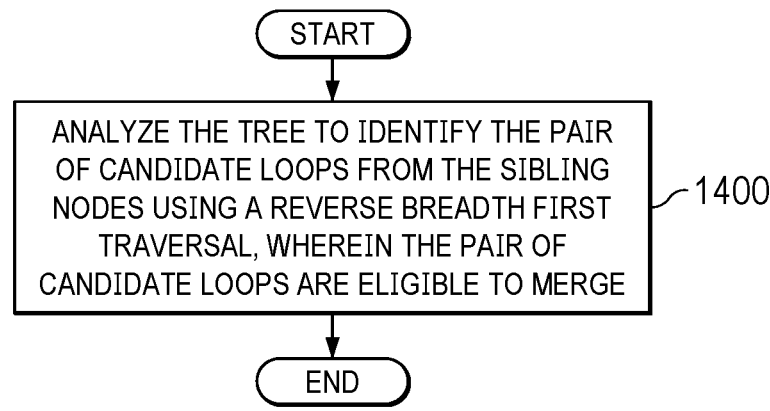
FIG. 14 is a flowchart of a process for analyzing the tree in accordance with an illustrative embodiment.

In FIG. 14, a flowchart of a process for analyzing the tree is depicted in accordance with an illustrative embodiment. The process in this figure is an example of an implementation for step 704 in FIG. 7.

The process analyzes the tree to identify the pair of candidate loops from the sibling nodes using a reverse breadth first traversal, wherein the pair of candidate loops is eligible to merge (step 1400). The process terminates thereafter.

Figure 15:
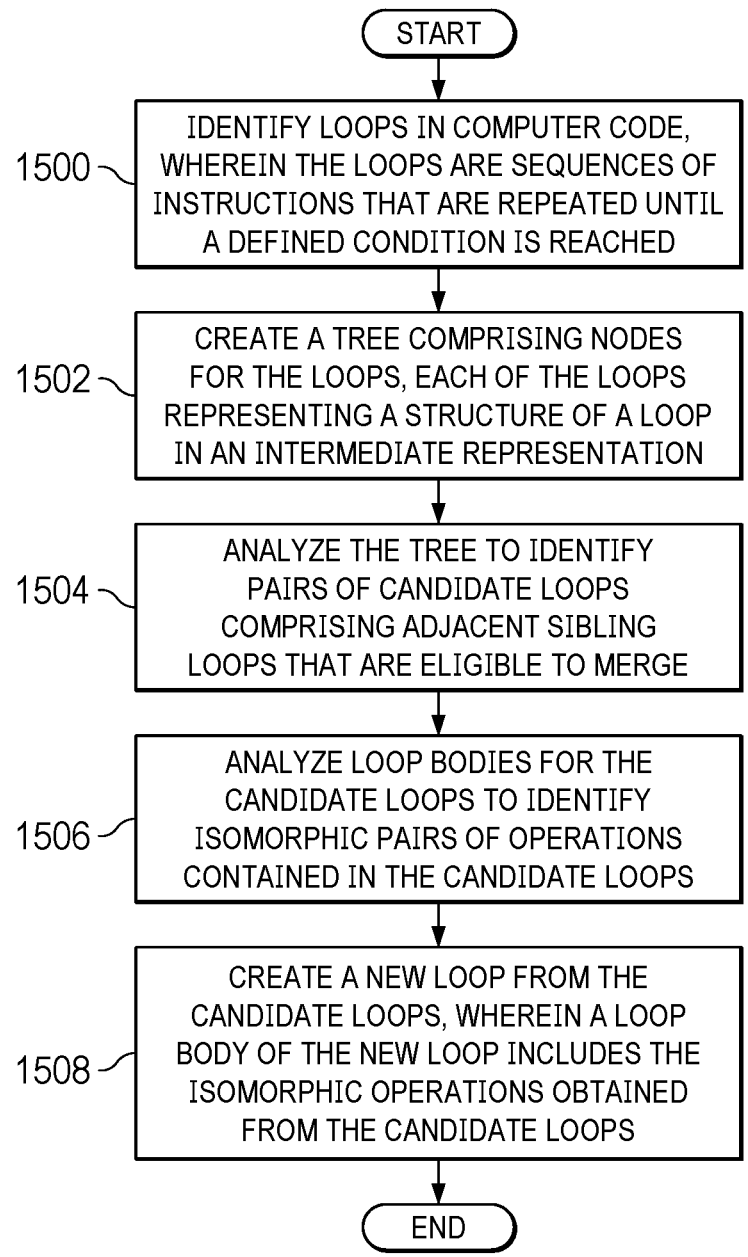
FIG. 15 is a flowchart of a process for merging loops in accordance with an illustrative embodiment.

With reference now to FIG. 15, a flowchart of a process for merging loops is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in loop optimizer 214 in computer system 212 in FIG. 2.

The process begins by identifying loops in computer code, wherein the loops are sequences of instructions that are repeated until a defined condition is reached (step 1500). The process creates a tree comprising nodes for the loops, each of the loops representing a structure of a loop in an intermediate representation (step 1502).

The process analyzes the tree to identify pair of candidate loops comprising adjacent sibling loops that are eligible to merge (step 1504). The process analyzes loop bodies for the candidate loops to identify isomorphic pairs of operations contained in the candidate loops (step 1506).

The process creates a new loop from the candidate loops, wherein a loop body of the new loop includes the isomorphic operations obtained from the candidate loops (step 1508).

The process terminates thereafter. This process can be performed for each pair of sibling nodes identified in the tree when the loops are fully isomorphic.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Next, FIGS. 16-24 illustrate process flows for merging candidate loops and for adjusting candidate loops. These example process flows are only provided as examples for different features of the illustrative examples are not meant to limit the illustrative examples to any particular example depicted in these figures.

Figure 16:
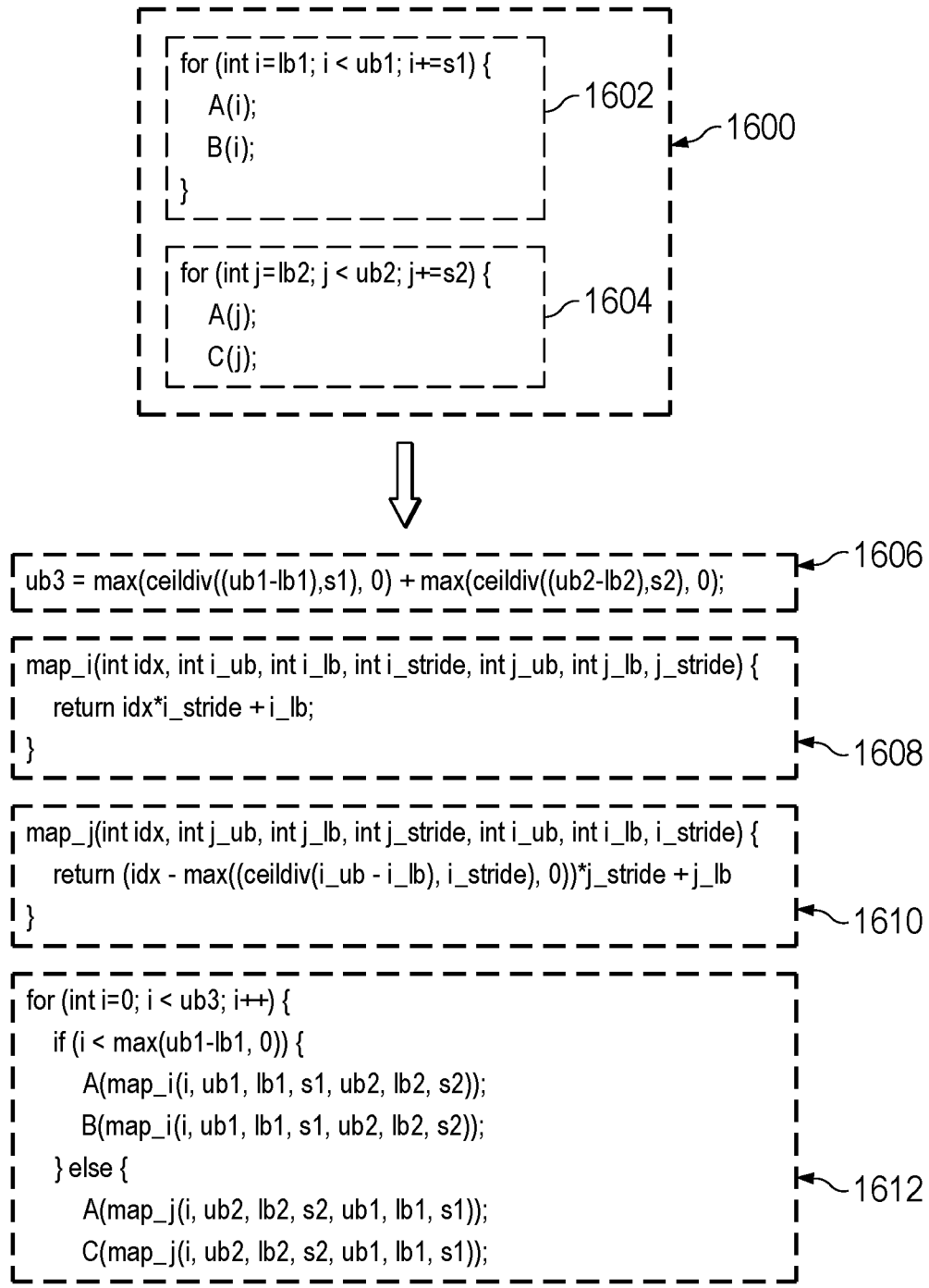
FIG. 16 is a process flow for creating a new loop from a pair of candidate loops in accordance with an illustrative embodiment.

With reference first to FIG. 16, a process flow for creating a new loop from a pair of candidate loops is depicted in accordance with an illustrative embodiment. In this illustrative example, pair of candidate loops 1600 comprises loop 1602 and loop 1604 that are eligible for merging to create new loop 1612.

As depicted, loop 1602 includes an induction variable "i" for operation block A(i) and operation B(i). Loop 1602 has an iteration space that includes values range from a lower bound "lb1" to an upper bound "ub1−1". In addition, loop 1602 is incremented by a value "s1" for each iteration.

In this example, loop 1604 has an induction variable "j" for operation block A(j) and operation block C(j). Loop 1604 has an iteration space that includes values range from a lower bound "lb2" to an upper bound "ub2−1". In addition, loop 1602 is incremented by a value "s2" for each iteration.

As depicted, computer code 1606 defines an upper bound "ub3" in an expanded iteration space for new loop 1612. Computer code 1608 defines an index mapping function for transforming the induction variable "i" from loop 1602 to a new induction variable to be used in new loop 1612. In a similar fashion, computer code 1610 defines an index mapping function for transforming the induction variable "j" from loop 1604 to the new induction variable to be used in new loop 1612.

Figure 17:
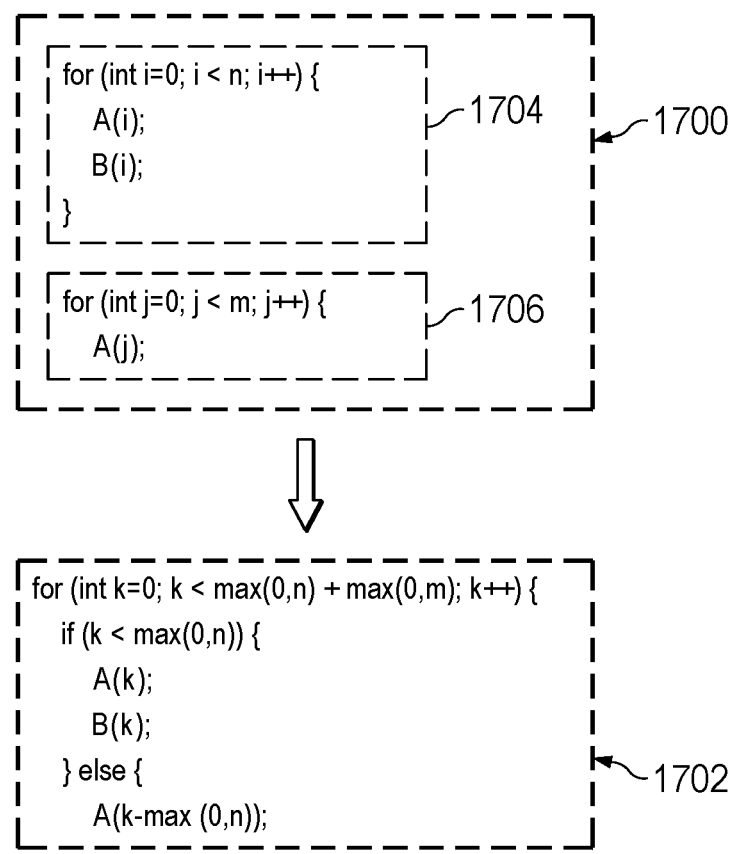
FIG. 17 is a process flow for creating a new loop from a pair of candidate loops in accordance with an illustrative embodiment.

With reference first to FIG. 17, a process flow for creating a new loop from a pair of candidate loops is depicted in accordance with an illustrative embodiment. In this illustrative example, pair of candidate loops 1700 comprises loop 1704 and loop 1706 that are eligible for merging to create new loop 1702.

As depicted, loop 1704 and loop 1706 are normalized loops. In this illustrative example, a loop is normalized when the loop has an iteration space with a lower bound of zero and an induction variable that increments by one for each iteration. The induction variable is an index used to track the number of iterations performed by a loop. An iteration space is a set of values that one or more induction variables can take during execution in a loop.

As depicted, loop 1704 has an induction variable "i" and an iteration space that includes values from 0 to n−1. In another example, loop 1706 has an induction variable "j" and an iteration space having values from 0 to m−1. New loop 1702 is created by merging loop 1704 and loop 1706. Further, in this example, new loop 1702 has an expanded iteration space that includes all of the values for the induction variables in loop 1704 and loop 1706. As depicted, induction variable "i" from loop 1704 and induction variable "j" from loop 1706 is replaced with induction variable "k" in new loop 1702 using index mapping as described above.

Figure 18:
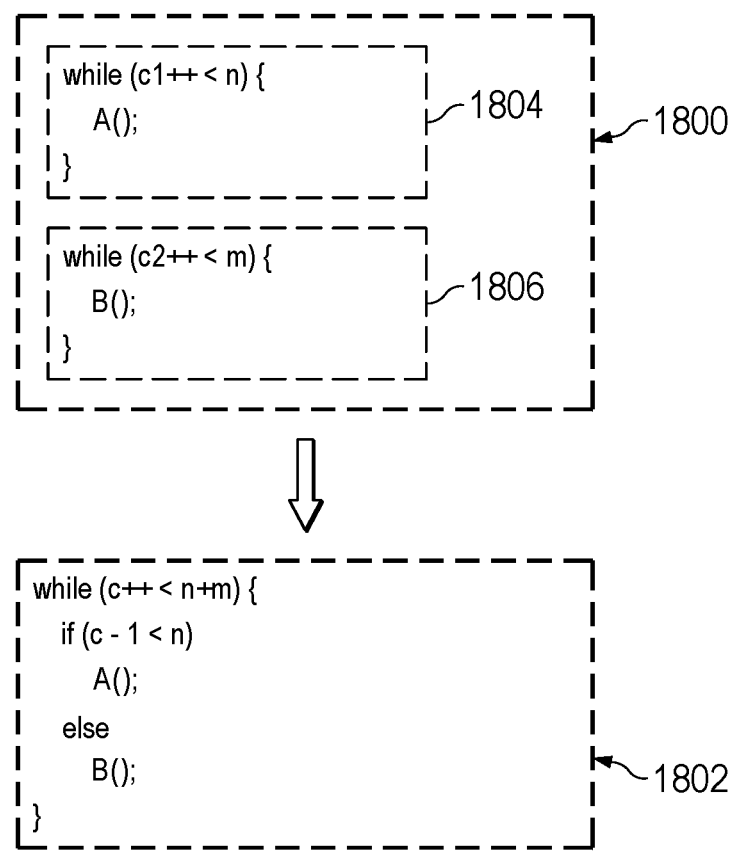
FIG. 18 is a process flow for creating a new loop from a pair of candidate loops without using induction variables in operations in accordance with an illustrative embodiment.

With reference to FIG. 18, a process flow for creating a new loop from a pair of candidate loops without using induction variables in operations is depicted in accordance with an illustrative embodiment. In this illustrative example, pair of candidate loops 1800 comprises loop 1804 and loop 1806 that are eligible for merging.

Loop 1804 and loop 1806 are examples of loops that can be merged without using induction variables in operations. Merging loop 1804 and loop 1806 creates new loop 1802. New loop 1802 has an expanded iteration space having all of the values for the induction variables in loop 1804 and loop 1806.

In this example, translating induction variables using index mapping is not necessary because induction variables are not used in operation block A( ) and operation block B( ) In this example, index mapping is a process of using index mapping functions. In this example, index mapping functions transform values for the induction variables in the pair of candidate loops into equivalent values for the induction variables in the new loop.

Figure 19:
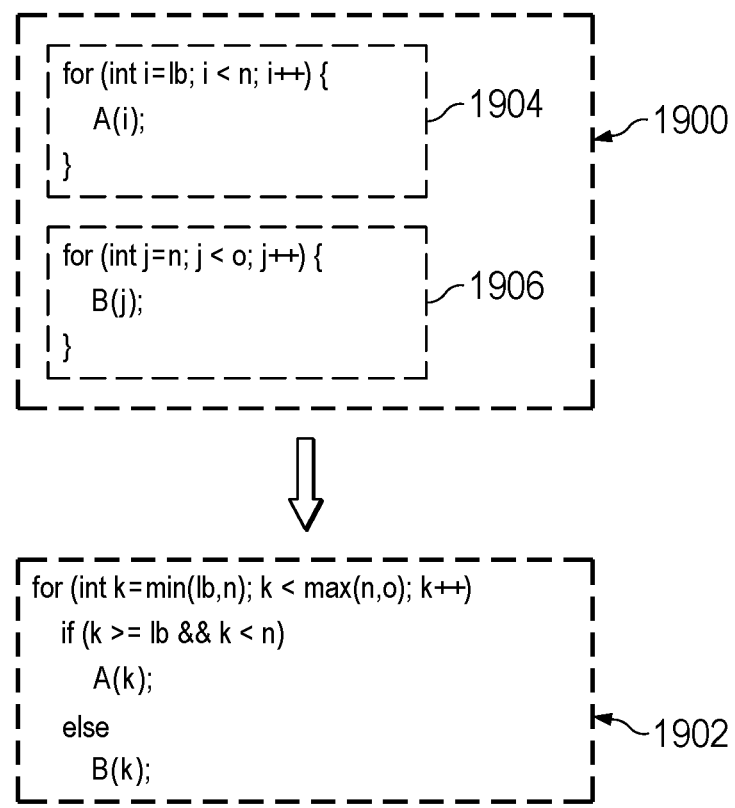
FIG. 19 is a process flow for creating a new loop from a pair of candidate loops with consecutive iteration spaces in accordance with an illustrative embodiment.

With reference to FIG. 19, a process flow for creating a new loop from a pair of candidate loops with consecutive iteration spaces is depicted in accordance with an illustrative embodiment. In this illustrative example, pair of candidate loops 1900 comprises loop 1904 and loop 1906 that are eligible for merging.

In this illustrative example, the iteration space for loop 1904 and the iteration space for loop 1906 are consecutive because loop 1904 has an iteration space that includes values from lb to n−1 and loop 1906 has an iteration space that includes values from n to o−1. In this example, lb is a lower bound. New loop 1902 is created by merging loop 1904 and loop 1906.

As depicted, new loop 1902 has an expanded iteration space that includes values from lb to o−1 that covers all of the values for the induction variables in loop 1904 and loop 1906. In this example, induction variable "i" from loop 1904 and induction variable "j" from loop 1906 are replaced with induction variable "k" in new loop 1902 using index mapping as described above.

Figure 20:
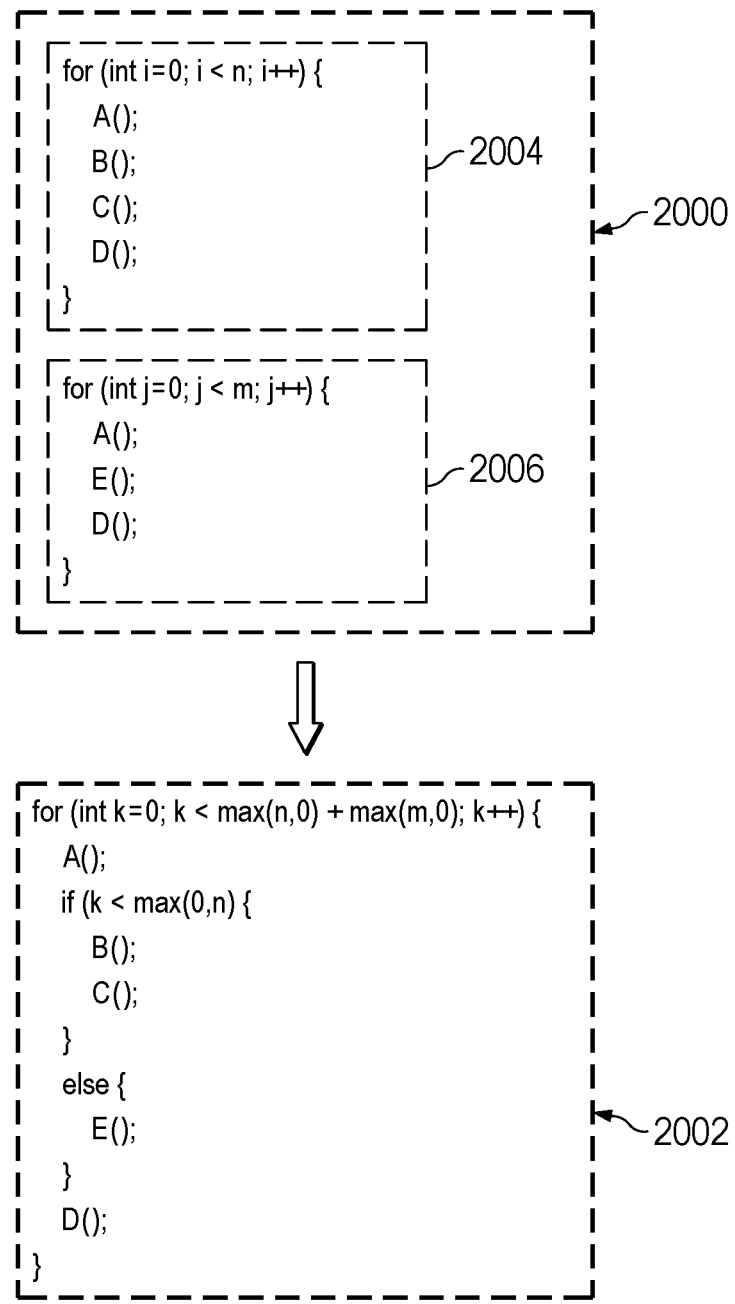
FIG. 20 is a process flow for creating a new loop from a pair of candidate loops including both isomorphic operations and non-isomorphic operations in accordance with an illustrative embodiment.

With reference to FIG. 20, a process flow for creating a new loop from a pair of candidate loops including both isomorphic operations and non-isomorphic operations is depicted in accordance with an illustrative embodiment. In one illustrative example, isomorphic operations can be identified by analyzing loop bodies for a pair of candidate loops. The analysis can be performed by determining whether any codes in operations match in the pair of candidate loops and recursively check if the operand for codes of operations in the pair of candidate loops are similar.

In this illustrative example, pair of candidate loops 2000 comprises loop 2004 and loop 2006 that are eligible for merging. In pair of candidate loops 2000, operation block A( ) and operation block D( ) in loop 2004 and loop 2006 are isomorphic operations. In this example, operation block A( ) in loop 2004 is isomorphic with respect to operation block A( ) in loop 2006. Similarly, operation block D( ) in loop 2004 is isomorphic with respect to operation block D( ) in loop 2006. On the other hand, operation block B( ) and operation block C( ) in loop 2004, and operation block E( ) in loop 2006 are non-isomorphic operations. No corresponding operation block exists in loop 2004 for operation block E( ) and no corresponding operation block exists in loop 2006 for operation block B( ) or operation block C( ).

In this example, new loop 2002 is created by merging loop 2004 and loop 2006. New loop 2002 has an expanded iteration space that includes all of the values for the induction variables in 2004 and loop 2006. In this example, isomorphic operations are executed for all iterations in new loop 2002 and non-isomorphic operations are conditionally executed based on the iteration space for non-isomorphic operations' corresponding loop before merging.

For example, isomorphic operations such as operation block A( ) and operation block D( ) are executed for all iterations in new loop 2002. On the other hand, non-isomorphic operations such as operation block B( ) and operation block C( ) are executed only when induction variable is less than n because operation block B( ) and operation block C( ) belong to loop 2004 that has an iteration space that includes values from 0 to n−1. In this example, induction variable "i" from loop 2004 and induction variable "j" from loop 2006 are replaced with induction variable "k" in new loop 2002 using the index mapping as described above.

Figure 21:
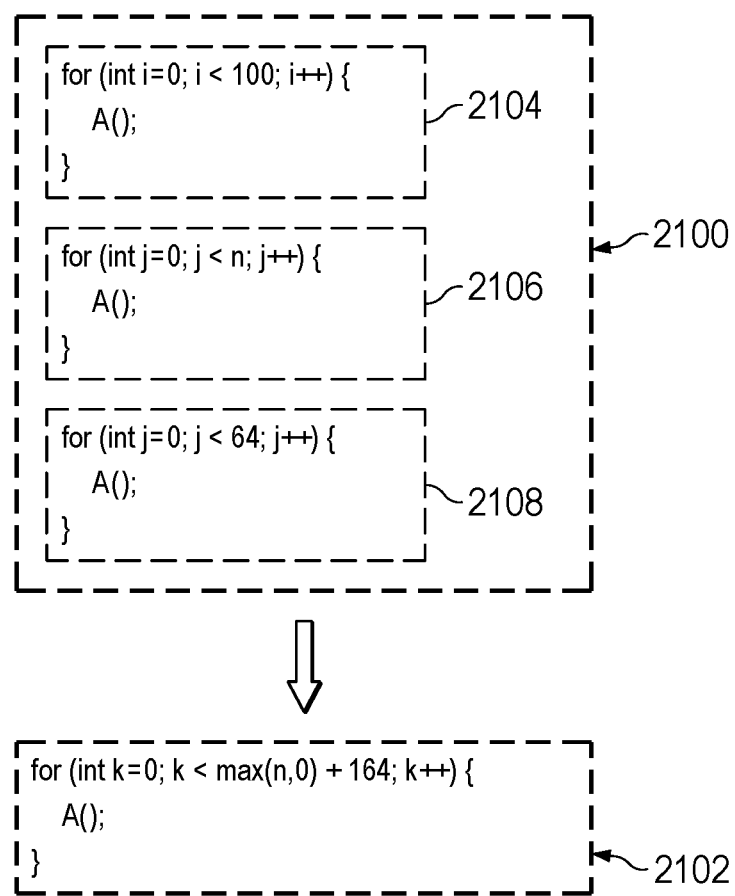
FIG. 21 is a process flow for creating a new loop from loops including isomorphic operations without induction variables in accordance with an illustrative embodiment.

With reference to FIG. 21, a process flow for creating a new loop from loops including isomorphic operations without induction variables is depicted in accordance with an illustrative embodiment. In this illustrative example, loops 2100 comprises loop 2104, loop 2106, and loop 2108 that are eligible for merging.

In this depicted example, loop 2104, loop 2106, and loop 2108 have an isomorphic operation block A( ) and execution of isomorphic operation block A( ) does not make use of an induction variable. In other words, induction variable "i" and induction variable "j" in loops 2100 are not used as input to operation block A( ) when loops in loops 2100 iterate.

Merging loop 2104, loop 2106, and loop 2108 creates new loop 2102. In this example, new loop 2102 has an expanded iteration space that includes all of the values for the induction variables in loop 2104, loop 2106, and loop 2108. In this example, induction variable "i" from loop 2104 and induction variable "j" from loop 2106 and loop 2108 are replaced with induction variable "k" in new loop 2102 using the index mapping as described above.

Figure 22:
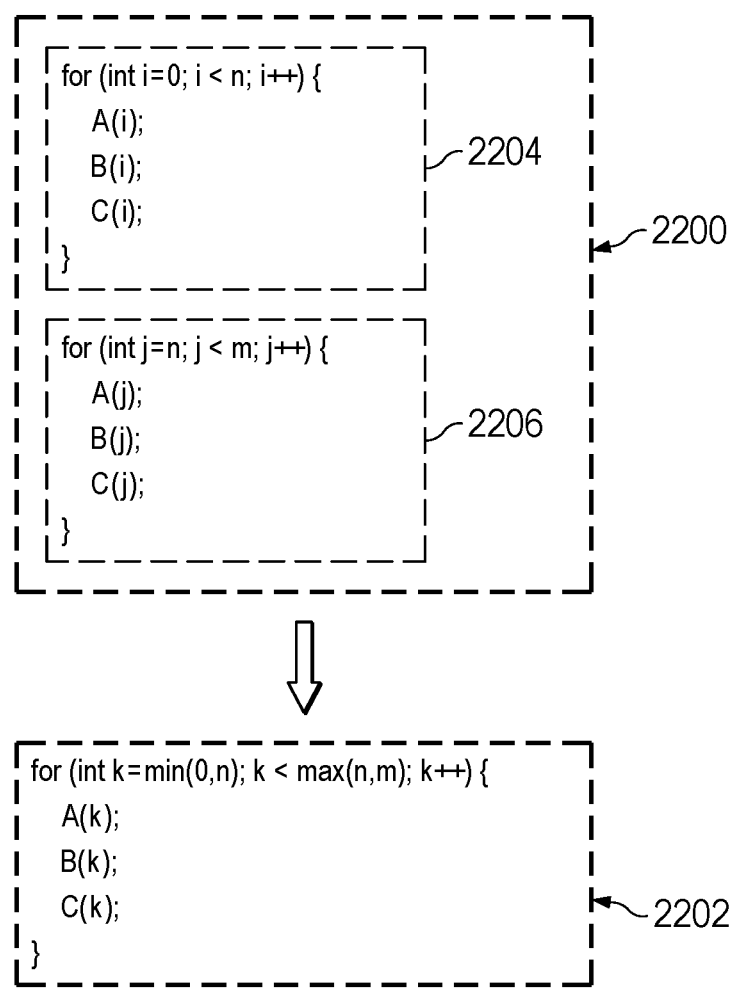
FIG. 22 is a process flow for creating a new loop from a pair of candidate loops including isomorphic operations with induction variables and consecutive iteration spaces in accordance with an illustrative embodiment.

With reference to FIG. 22, a process flow for creating a new loop from a pair of candidate loops including isomorphic operations with induction variables and consecutive iteration spaces is depicted in accordance with an illustrative embodiment. As depicted, pair of candidate loops 2200 comprises loop 2204 and loop 2206 that are eligible for merging.

New loop 2202 is created by merging loop 2204 and loop 2206. In this example, the iteration space for loop 2204 and the iteration space for loop 2206 are consecutive because loop 2204 has an iteration space that includes values from 0 to n−1 and loop 2206 has an iteration space from n to m−1. New loop 2202 has an expanded iteration space that includes all of the values for the induction variables in loop 2204 and loop 2206. In this example, induction variable "i" from loop 2204 and induction variable "j" from loop 2206 are replaced with induction variable "k" in new loop 2202 using the index mapping as described above.

Figure 23:
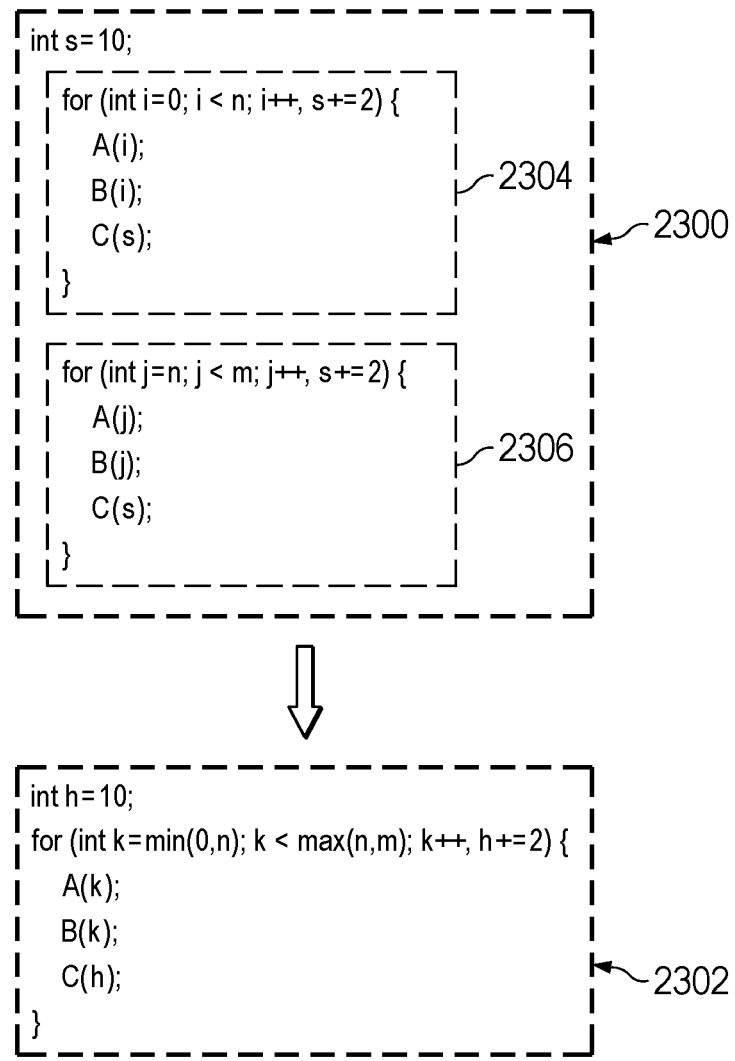
FIG. 23 is a process flow for creating a new loop from a pair of candidate loops including isomorphic operations with different induction variables and consecutive iteration spaces in accordance with an illustrative embodiment.

With reference to FIG. 23, a process flow for creating a new loop from a pair of candidate loops including isomorphic operations with different induction variables and consecutive iteration spaces is depicted in accordance with an illustrative embodiment. In this illustrative example, pair of candidate loops 2300 comprises loop 2304 and loop 2306 that are eligible for merging. The iteration space for loop 2304 and the iteration space for loop 2306 are consecutive because loop 2304 has an iteration space that includes values from 0 to n−1 and loop 2306 has an iteration space that includes values from n to m−1. Pair of candidate loops 2300 includes multiple induction variables. For example, loop 2304 includes an induction variable "i" for operation block A(i) and operation block B(i). Additionally, loop 2304 includes an induction variable "s" for operation block C(s). In a similar fashion, loop 2306 includes an induction variable "i" for operation block A(i) and operation block B(i). In addition, loop 2306 includes an induction variable "s" for operation block C(s).

In this example, new loop 2302 is created by merging loop 2304 and loop 2306. New loop 2302 has an expanded iteration space that includes all of the values for the induction variables in loop 2304 and loop 2306. In this example, induction variable "i" from loop 2304 and induction variable "j" from loop 2306 are replaced with induction variable "k" in new loop 2302 using index mapping as described above. In a similar fashion, induction "s" from loop 2304 and loop 2306 is replaced with induction variable "h" in new loop 2302.

Figure 24:
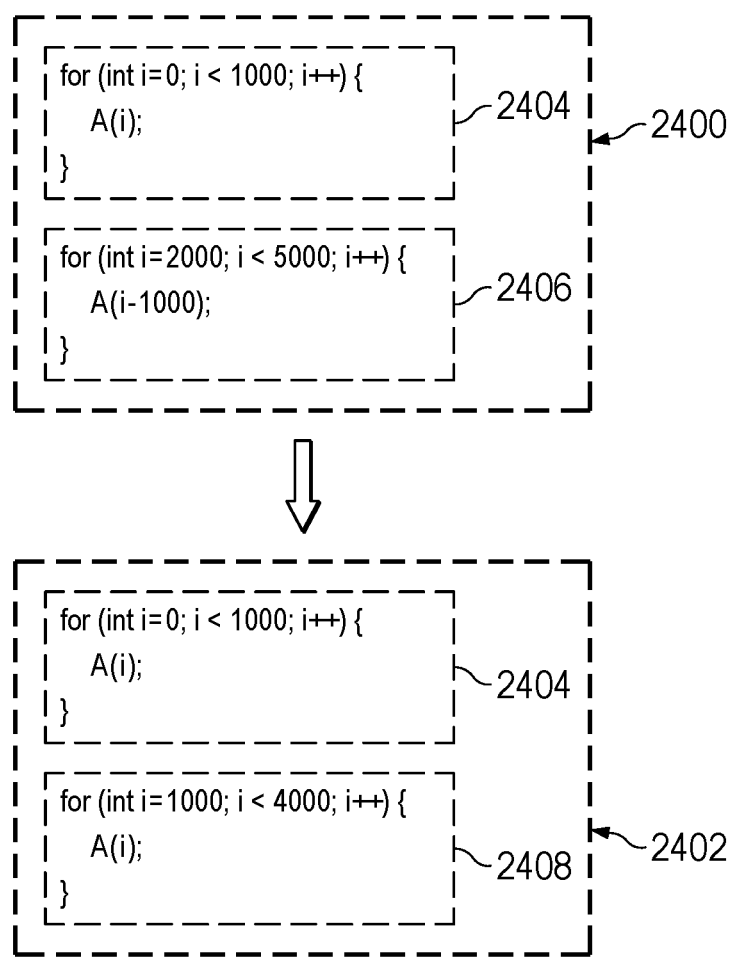
FIG. 24 is a process flow for generating a pair of candidate loops with consecutive iteration spaces by shifting iteration spaces of a candidate loop in accordance with an illustrative embodiment.

With reference to FIG. 24, a process flow for of generating a pair of candidate loops with consecutive iteration spaces by shifting iteration spaces of a candidate loop is depicted in accordance with an illustrative embodiment. In this illustrative example, pair of candidate loops 2400 comprises loop 2404 and loop 2406.

As depicted, loop 2404 has an iteration space that includes values from 0 to 999 and loop 2406 has an iteration space that includes values from 2000 to 4999. Loop 2404 and loop 2406 in candidate loops 2400 are not mergeable because the iteration space for loop 2404 and the iteration space for loop 2406 are not consecutive.

In this illustrative example, loop 2406 includes operation block A(i-1000) that can be transformed to block A(i). By performing such transformation, the iteration space for loop 2406 can be shifted to a set of values that includes values from 1000 to 3999, as illustrated by loop 2408. After the shifting, loop 2404 and loop 2408 in pair of candidate loops 2402 are eligible for merging because the iteration space for loop 2404 and the iteration space for loop 2408 are now consecutive.

Figure 25:
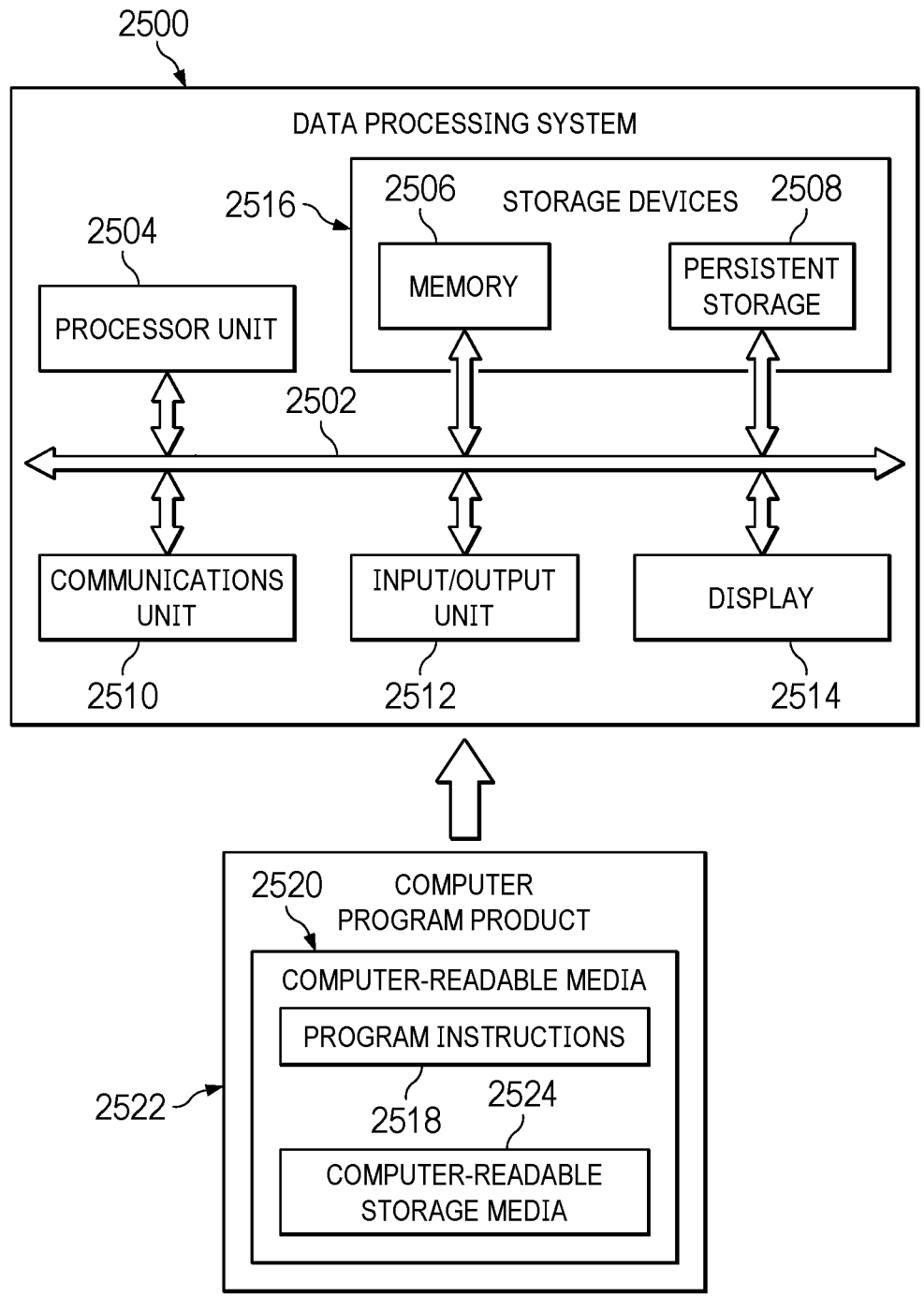
FIG. 25 is a block diagram of a data processing system in accordance with an illustrative embodiment.

Turning now to FIG. 25, a block diagram of a data processing system is depicted in accordance with an illustrative embodiment. Data processing system 2500 can be used to implement computers and computing devices in computing environment 100 in FIG. 1. Data processing system 2500 can also be used to implement computer system 212 in FIG. 2. In this illustrative example, data processing system 2500 includes communications framework 2502, which provides communications between processor unit 2504, memory 2506, persistent storage 2508, communications unit 2510, input/output (I/O) unit 2512, and display 2514. In this example, communications framework 2502 takes the form of a bus system.

Processor unit 2504 serves to execute instructions for software that can be loaded into memory 2506. Processor unit 2504 includes one or more processors. For example, processor unit 2504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2504 can be implemented using one or more heterogeneous processor systems in which a main processor is present with secondary processors on a single chip. As another illustrative example, processor unit 2504 can be a symmetric multi-processor system containing multiple processors of the same type on a single chip.

Memory 2506 and persistent storage 2508 are examples of storage devices 2516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2516 may also be referred to as computer readable storage devices in these illustrative examples. Memory 2506, in these examples, can be, for example, a random-access memory or any other suitable volatile or non-volatile storage device. Persistent storage 2508 may take various forms, depending on the particular implementation.

For example, persistent storage 2508 may contain one or more components or devices. For example, persistent storage 2508 can be a hard drive, a solid-state drive (SSD), a flash memory, a rewritable optical disk, a rewritable magnetic tape, or some combination of the above. The media used by persistent storage 2508 can also be removable. For example, a removable hard drive can be used for persistent storage 2508.

Communications unit 2510, in these illustrative examples, provides for communications with other data processing systems or devices. In these illustrative examples, communications unit 2510 is a network interface card.

Input/output unit 2512 allows for input and output of data with other devices that can be connected to data processing system 2500. For example, input/output unit 2512 may provide a connection for user input through at least one of a keyboard, a mouse, or some other suitable input device. Further, input/output unit 2512 may send output to a printer. Display 2514 provides a mechanism to display information to a user.

Instructions for at least one of the operating system, applications, or programs can be located in storage devices 2516, which are in communication with processor unit 2504 through communications framework 2502. The processes of the different embodiments can be performed by processor unit 2504 using computer-implemented instructions, which may be located in a memory, such as memory 2506.

These instructions are referred to as program instructions, computer usable program instructions, or computer readable program instructions that can be read and executed by a processor in processor unit 2504. The program instructions in the different embodiments can be embodied on different physical or computer readable storage media, such as memory 2506 or persistent storage 2508.

Program instructions 2518 are located in a functional form on computer readable media 2520 that is selectively removable and can be loaded onto or transferred to data processing system 2500 for execution by processor unit 2504. Program instructions 2518 and computer readable media 2520 form computer program product 2522 in these illustrative examples. In the illustrative example, computer readable media 2520 is computer readable storage media 2524.

Computer readable storage media 2524 is a physical or tangible storage device used to store program instructions 2518 rather than a medium that propagates or transmits program instructions 2518. Computer readable storage media 2524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2518 can be transferred to data processing system 2500 using a computer readable signal media. The computer readable signal media are signals and can be, for example, a propagated data signal containing program instructions 2518. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 2520" can be singular or plural. For example, program instructions 2518 can be located in computer readable media 2520 in the form of a single storage device or system. In another example, program instructions 2518 can be located in computer readable media 2520 that is distributed in multiple data processing systems. In other words, some instructions in program instructions 2518 can be located in one data processing system while other instructions in program instructions 2518 can be located in one data processing system. For example, a portion of program instructions 2518 can be located in computer readable media 2520 in a server computer while another portion of program instructions 2518 can be located in computer readable media 2520 located in a set of client computers.

The different components illustrated for data processing system 2500 are not meant to provide architectural limitations to the manner in which different embodiments can be implemented. In some illustrative examples, one or more of the components may be incorporated in or otherwise form a portion of, another component. For example, memory 2506, or portions thereof, may be incorporated in processor unit 2504 in some illustrative examples. The different illustrative embodiments can be implemented in a data processing system including components in addition to or in place of those illustrated for data processing system 2500. Other components shown in FIG. 25 can be varied from the illustrative examples shown. The different embodiments can be implemented using any hardware device or system capable of running program instructions 2518.

Thus, illustrative embodiments of the present disclosure provide a computer implemented method, computer system, and computer program product for merging loops. A number of processor units identifies loops in computer code. The loops are sequences of instructions that are repeated until conditions for the loops are reached. The number of processor units creates a tree comprising nodes that represent the loops and edges that represent relationships between nodes. The number of processor units utilizes the tree to identify a pair of candidate loops from sibling nodes. The number of processor units creates a new loop from the pair of candidate loops with an expanded iteration space based on iteration spaces for the pair of candidate loops in response to the pair of candidate loops being eligible for merging.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for merging loops, comprising:
   identifying, by a number of processor units, loops in computer code, wherein the loops are sequences of instructions that are repeated until conditions for the loops are reached;
   creating, by the number of processor units, a tree comprising nodes that represent the loops and edges that represent relationships between nodes;
   analyzing, by the number of processor units, the tree to identify a pair of candidate loops from sibling nodes; and
   creating, by the number of processor units, a new loop from the pair of candidate loops with an expanded iteration space based on iteration spaces for the pair of candidate loops in response to the pair of candidate loops being eligible for merging.

2. The computer implemented method of claim 1 further comprising:
   repeating, by the number of processor units, analyzing the tree to identify the pair of candidate loops and creating the new loop from the pair of candidate loops for each pair of sibling nodes in the tree.

3. The computer implemented method of claim 1 further comprising:
   analyzing, by the number of processor units, loop bodies for the pair of candidate loops to identify pairs of isomorphic operations contained in the pair of candidate loops, wherein a loop body of the new loop includes isomorphic operations from the pairs of isomorphic operations identified in the pair of candidate loops.

4. The computer implemented method of claim 1 further comprising:
   determining, by the number of processor units, whether the pair of candidate loops is eligible for merging using eligibility factors comprising both loops following structured control flow principle; both loops are monotonically changing; and either no intervening code exists between the pair of candidate loops or if the intervening code is present between the pair of candidate loops, the intervening code does not have any dependency on either loop in the pair of candidate loops.

5. The computer implemented method of claim 1, wherein, by the number of processor units, creating the new loop further comprises:
   applying, by the number of processor units, rewrite mapping rules to create new operations for a loop body for the new loop.

6. The computer implemented method of claim 1 further comprising:
   determining, by the number of processor units, whether to merge the pair of candidate loops to form the new loop using a set of objectives.

7. The computer implemented method of claim 6, wherein determining, by the number of processor units, whether to merge the pair of candidate loops further comprises:
   determining, by the number of processor units, a ratio of isomorphic operations to non-isomorphic operations for the pair of candidate loops; and
   determining, by the number of processor units, whether to create the new loop from the pair of candidate loops based on whether the ratio of isomorphic operations to non-isomorphic operations is greater than a threshold.

8. The computer implemented method of claim 1, wherein analyzing, by the number of processor units, the tree further comprises:
   analyzing, by the number of processor units, the tree to identify the pair of candidate loops from sibling nodes using a reverse breadth first traversal, wherein the pair of candidate loops are eligible to merge.

9. A computer implemented method for merging loops, comprising:
   identifying, by a number of processor units, loops in computer code, wherein the loops are sequences of instructions that are repeated until a defined condition is reached;
   creating, by the number of processor units, a tree comprising nodes for the loops, each of the loops representing a structure of a loop in an intermediate representation;
   analyzing, by the number of processor units, the tree to identify a pair of candidate loops comprising adjacent sibling loops that are eligible to merge;
   analyzing, by the number of processor units, loop bodies for the candidate loops to identify isomorphic pairs of operations contained in the candidate loops; and
   creating, by the number of processor units, a new loop from the candidate loops, wherein a loop body of the new loop includes isomorphic operations obtained from the candidate loops.

10. The computer implemented method of claim 9 further comprising:
repeating, by the number of processor units, analyzing the tree to identify the pair of candidate loops; analyzing the loop bodies for the pair of candidate loops, and creating the new loop from the pair of candidate loops for each pair of sibling nodes in the tree.

11. The computer implemented method of claim 9, wherein creating, by the number of processor units, the new loop further comprises:
applying, by the number of processor units, rewrite mapping rules to create new operations for the loop body of the new loop.

12. The computer implemented method of claim 9 further comprising:
performing, by the number of processor units, a profitability evaluation to determine whether a transformation of the pair of candidate loops meets a set of objectives.

13. A computer system that comprises: a hardware processor that executes program instructions to:
identify loops in computer code, wherein the loops are sequences of instructions that are repeated until conditions for the loops are reached;
create a tree comprising nodes that represent the loops and edges that represent relationships between nodes;
analyze the tree to identify a pair of candidate loops from sibling nodes; and
create a new loop from the pair of candidate loops with an expanded iteration space based on iteration spaces for the pair of candidate loops in response to the pair of candidate loops being eligible for merging.

14. The computer system of claim 13, wherein the hardware processor further executes the program instructions to:
repeat analyzing the tree to identify the pair of candidate loops and creating the new loop from the pair of candidate loops for each pair of sibling nodes in the tree.

15. The computer system of claim 13, wherein the hardware processor further executes the program instructions to analyze loop bodies for the pair of candidate loops to identify pairs of isomorphic operations contained in the pair of candidate loops, wherein a loop body of the new loop includes isomorphic operations from the pairs of isomorphic operations identified in the pair of candidate loops.

16. The computer system of claim 13, wherein the hardware processor further executes the program instructions to:
determine whether the pair of candidate loops is eligible for merging using eligibility factors comprising both loops follow structured control flow principle; both loops are monotonically changing; and either no intervening code exists between the pair of candidate loops or if the intervening code is present between the pair of candidate loops, the intervening code does not have any dependency on either loop in the pair of candidate loops.

17. The computer system of claim 13, wherein in creating the new loop, the hardware processor further executes the program instructions to: apply rewrite mapping rules to create new operations for a loop body for the new loop.

18. The computer system of claim 13, wherein the hardware processor further executes the program instructions to determine whether to merge the pair of candidate loops to form the new loop using a set of objectives.

19. The computer system of claim 18, wherein in determining whether to merge the pair of candidate loops, the hardware processor further executes the program instructions to:
determine a ratio of isomorphic operations to non-isomorphic operations for the pair of candidate loops; and
determine whether to create the new loop from the pair of candidate loops based on whether the ratio of isomorphic operations to non-isomorphic operations is greater than a threshold.

20. The computer system of claim 13, wherein in analyzing the tree, the hardware processor further executes the program instructions to:
analyze the tree to identify the pair of candidate loops from sibling nodes using a reverse breadth first traversal, wherein the pair of candidate loops are eligible to merge.

21. A computer system that comprises a hardware processor that executes program instructions to:
identify loops in computer code, wherein the loops are sequences of instructions that are repeated until a defined condition is reached;
create a tree comprising nodes for the loops, each of the loops representing a structure of a loop in an intermediate representation;
analyze the tree to identify a pair of candidate loops comprising adjacent sibling loops that are eligible to merge;
analyze loop bodies for the candidate loops to identify isomorphic pairs of operations contained in the candidate loops; and
create a new loop from the candidate loops, wherein the loop body of the new loop includes isomorphic operations obtained from the candidate loops.

22. The computer system of claim 21, wherein the hardware processor further executes the program instructions to:
repeat analyzing the tree to identify the pair of candidate loops and creating the new loop from the pair of candidate loops for each pair of sibling nodes in the tree.

23. A computer program product for merging a loops, the computer program product comprising a computer readable storage medium having program instructions embodied therewith, the program instructions executable by a computer system to cause the computer system to:
identify loops in computer code, wherein the loops are sequences of instructions that are repeated until conditions for the loops are reached;
create a tree comprising nodes that represent the loops and edges that represent relationships between nodes;
analyze the tree to identify a pair of candidate loops from sibling nodes; and
create a new loop from the pair of candidate loops with an expanded iteration space based on iteration spaces for the pair of candidate loops in response to the pair of candidate loops being eligible for merging.

24. The computer program product of claim 23, wherein the program instructions are further executable by the computer system to cause the computer system to:
repeat analyzing the tree to identify the pair of candidate loops and creating the new loop from the pair of candidate loops for each pair of sibling nodes in the tree.

25. The computer program product of claim 23, wherein the program instructions are further executable by the computer system to cause the computer system to:

analyze loop bodies for the pair of candidate loops to identify pairs of isomorphic operations contained in the pair of candidate loops, wherein a loop body of the new loop includes isomorphic operations from the pairs of isomorphic operations identified in the pair of candidate loops.

\* \* \* \* \*